(12) United States Patent
Sixta

(10) Patent No.: US 9,712,702 B1
(45) Date of Patent: Jul. 18, 2017

(54) APPARATUS AND METHOD FOR IMAGING PHYSICAL DOCUMENTS

(71) Applicant: ArcaSearch Corporation, Paynesville, MN (US)

(72) Inventor: Calvin G. Sixta, Paynesville, MN (US)

(73) Assignee: ArcaSearch Corporation, Paynesville, MN (US)

( * ) Notice: Subject to any disclaimer, the term of this patent is extended or adjusted under 35 U.S.C. 154(b) by 0 days.

(21) Appl. No.: 14/216,407

(22) Filed: Mar. 17, 2014

Related U.S. Application Data

(60) Provisional application No. 61/786,886, filed on Mar. 15, 2013, provisional application No. 61/824,834, filed on May 17, 2013.

(51) Int. Cl.
| | | |
|---|---|---|
| *H04N 1/04* | (2006.01) | |
| *H04N 1/00* | (2006.01) | |
| *H04N 1/10* | (2006.01) | |

(52) U.S. Cl.
CPC ......... *H04N 1/0066* (2013.01); *H04N 1/1061* (2013.01)

(58) Field of Classification Search
CPC .......................... H04N 1/0066; H04N 1/1061
USPC ....... 358/496, 498, 487, 506, 505, 474, 497, 358/408, 471, 403; 382/305, 306
See application file for complete search history.

(56) References Cited

U.S. PATENT DOCUMENTS

| | | | | |
|---|---|---|---|---|
| 4,097,846 A | * | 6/1978 | Lewis | G06K 9/20 382/301 |
| 4,348,104 A | * | 9/1982 | Ovshinsky | G03B 27/47 355/41 |
| 4,355,890 A | * | 10/1982 | Klose | G03B 27/47 355/54 |
| 4,487,488 A | * | 12/1984 | Burbank, III | G03B 23/06 353/103 |
| 4,830,484 A | * | 5/1989 | Yamamoto | G03B 21/116 353/25 |
| 5,218,673 A | * | 6/1993 | Fujiwara | G06F 17/30017 235/454 |
| 5,457,547 A | * | 10/1995 | Yamada | H04N 1/00267 355/84 |
| 5,818,611 A | * | 10/1998 | Shih | 358/474 |
| 5,845,018 A | * | 12/1998 | Breish | H04N 1/00795 382/276 |
| 6,788,437 B1 | * | 9/2004 | Boyd | H04N 1/00249 358/474 |
| 6,810,136 B2 | * | 10/2004 | Stern | G06K 9/00993 382/123 |
| 6,952,281 B1 | | 10/2005 | Irons et al. | |
| 8,111,927 B2 | | 2/2012 | Vincent | |
| 8,526,761 B2 | | 9/2013 | Kojima | |
| 2004/0076327 A1 | * | 4/2004 | Stern | G06K 9/00993 382/173 |
| 2005/0135708 A1 | * | 6/2005 | Joyce | H04N 1/00127 382/306 |
| 2005/0190412 A1 | * | 9/2005 | Noguchi | H04N 1/00355 358/474 |

(Continued)

*Primary Examiner* — Cheukfan Lee
(74) *Attorney, Agent, or Firm* — Suiter Swantz pc llo

(57) ABSTRACT

An imaging station includes at least one camera and at least one computing device, the at least one computing device being communicatively coupled to the at least one camera, wherein the at least one computing device is configured to receive raw image data of a physical document from the at least one camera.

17 Claims, 32 Drawing Sheets

(56) References Cited

U.S. PATENT DOCUMENTS

| | | | |
|---|---|---|---|
| 2006/0097131 A1* | 5/2006 | Ohara | H04N 1/02815 |
| | | | 250/208.1 |
| 2006/0176521 A1* | 8/2006 | Stern | G06F 17/30011 |
| | | | 358/462 |
| 2007/0011149 A1 | 1/2007 | Walker | |
| 2008/0118112 A1 | 5/2008 | Gotoh et al. | |

* cited by examiner

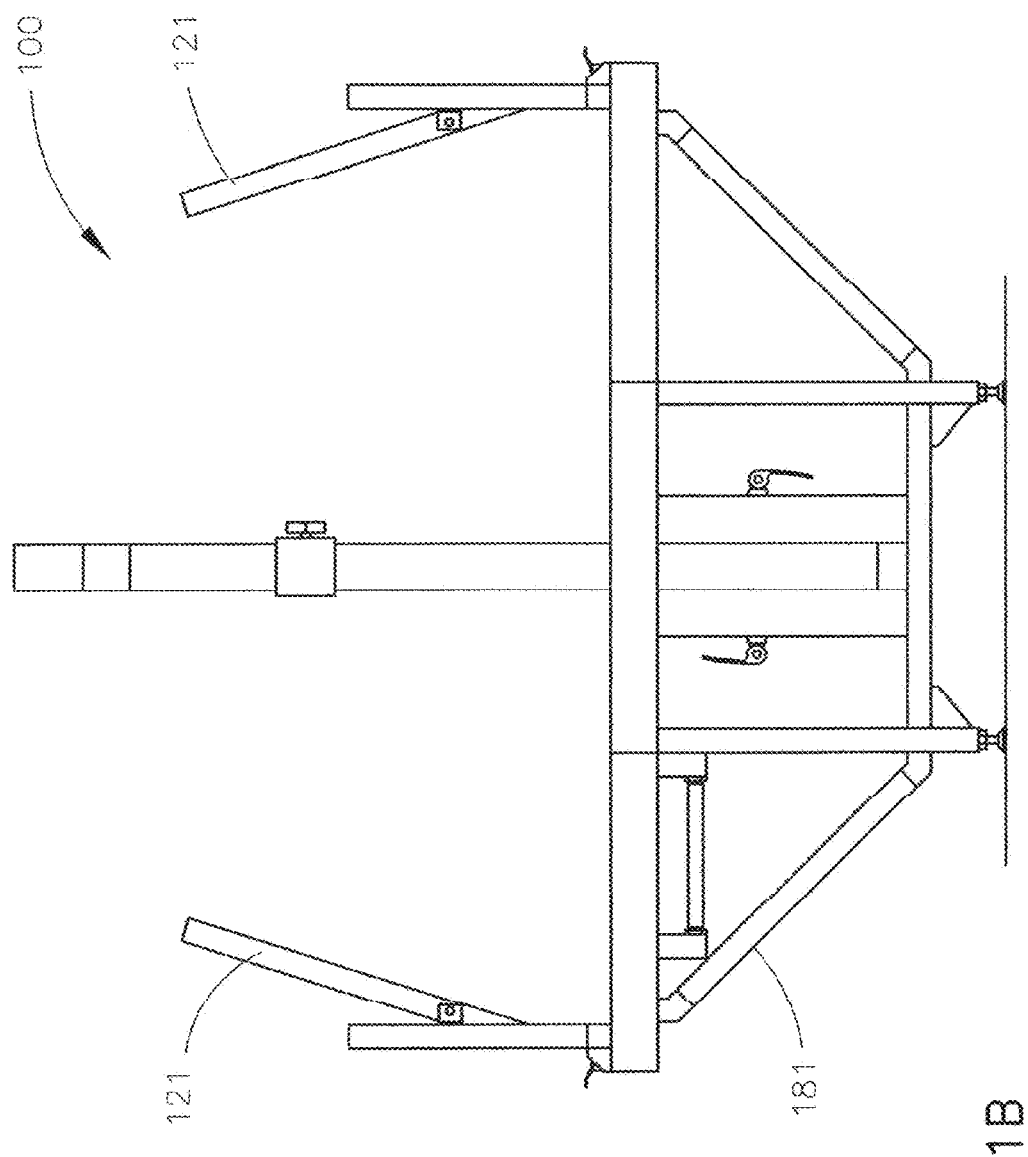

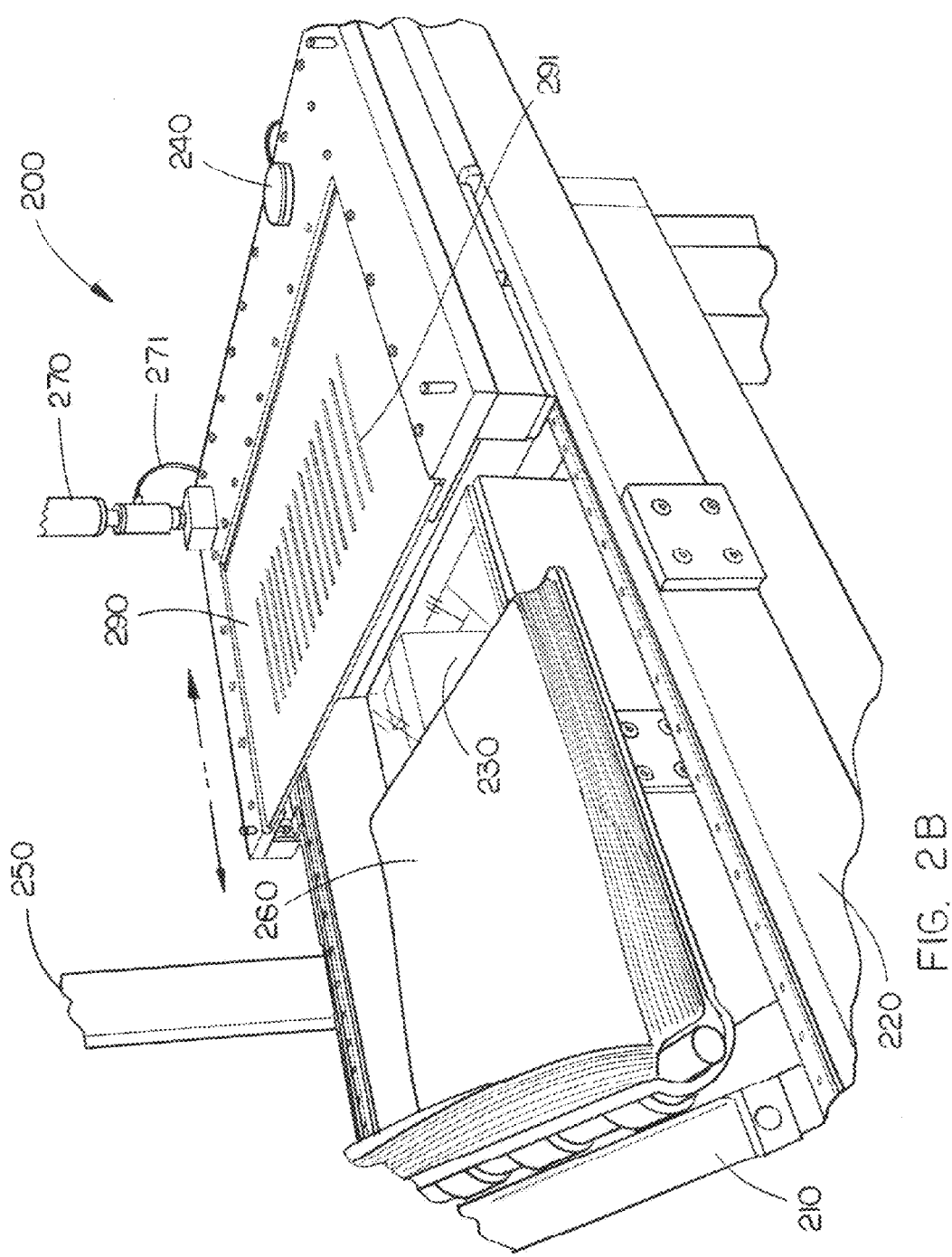

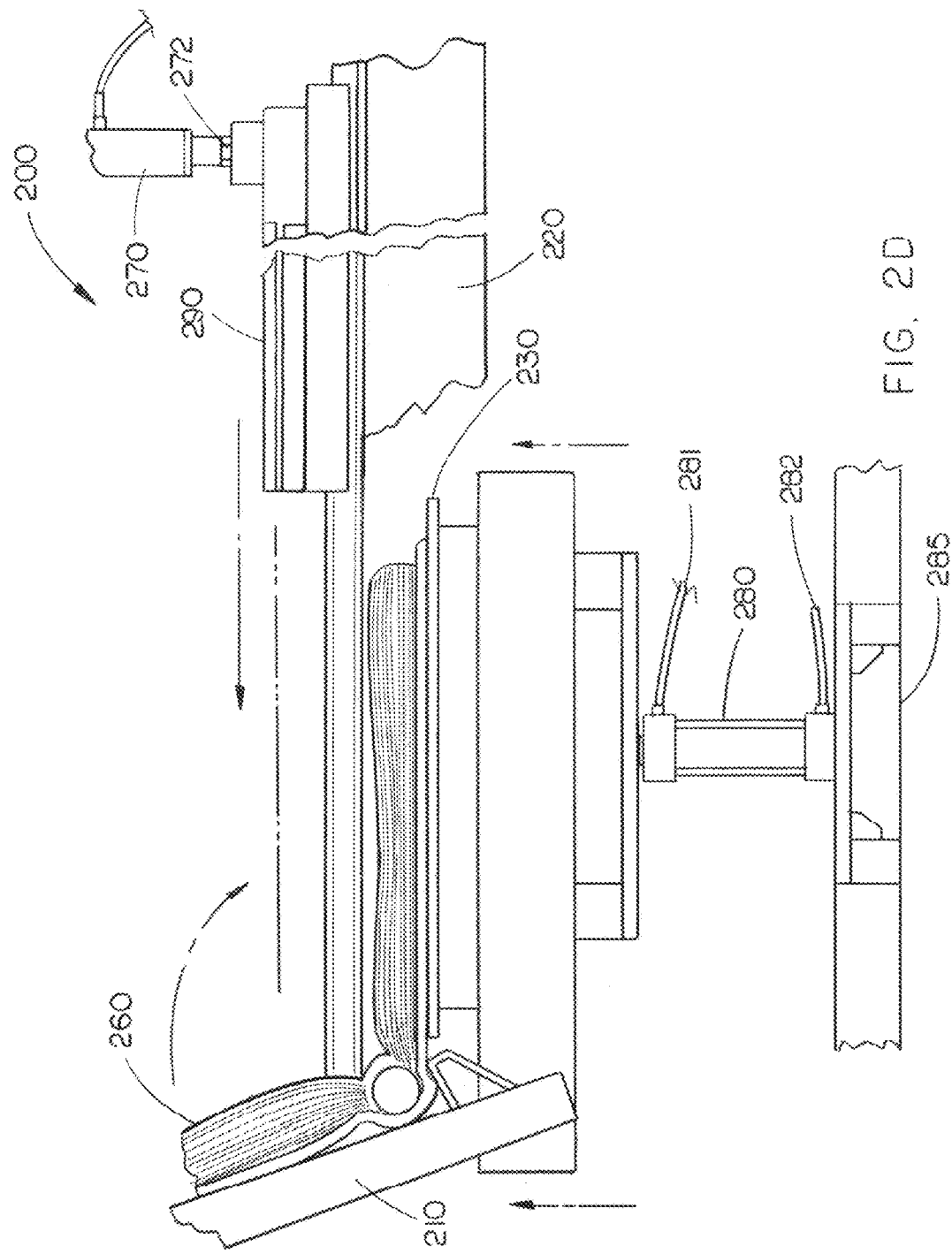

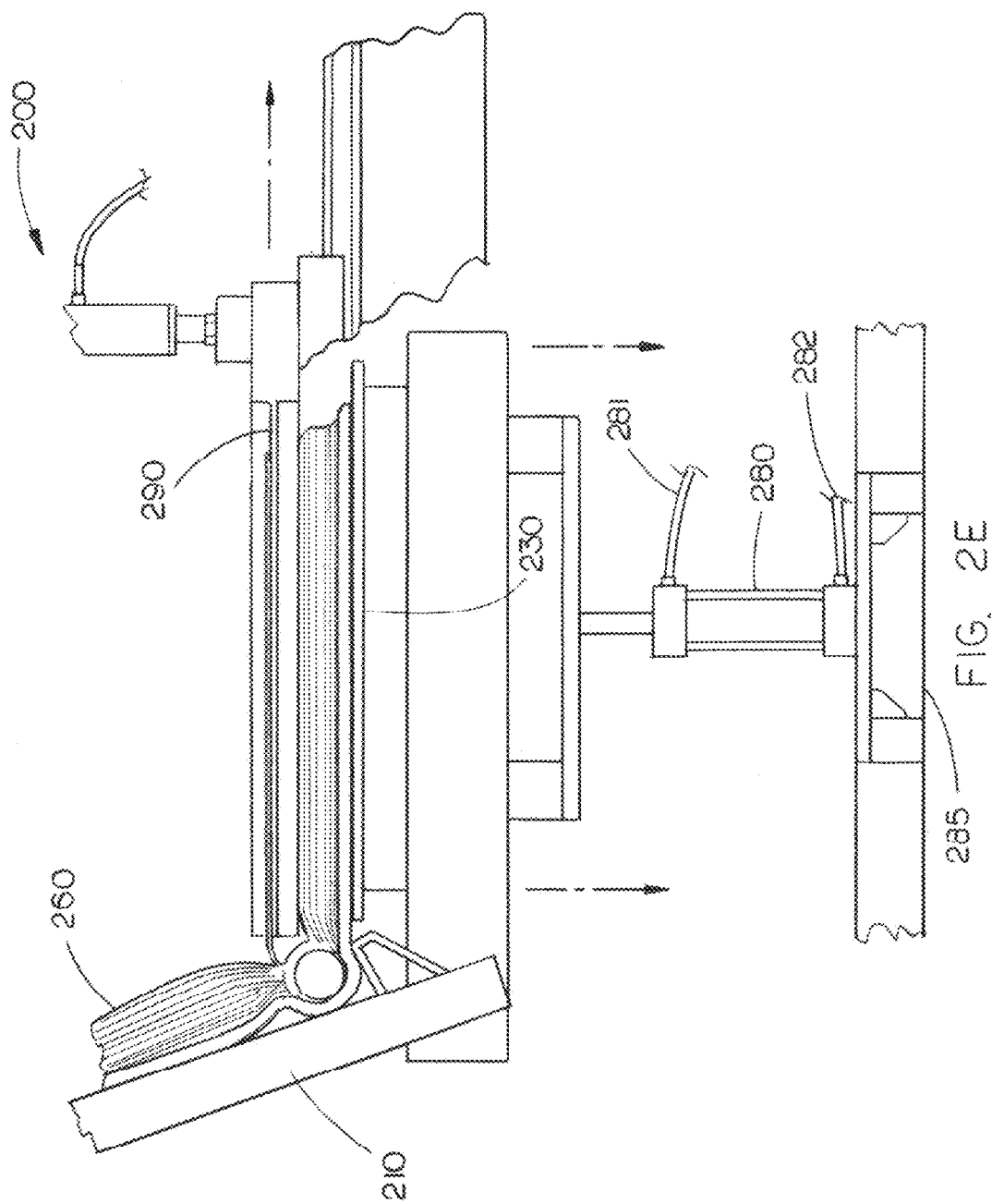

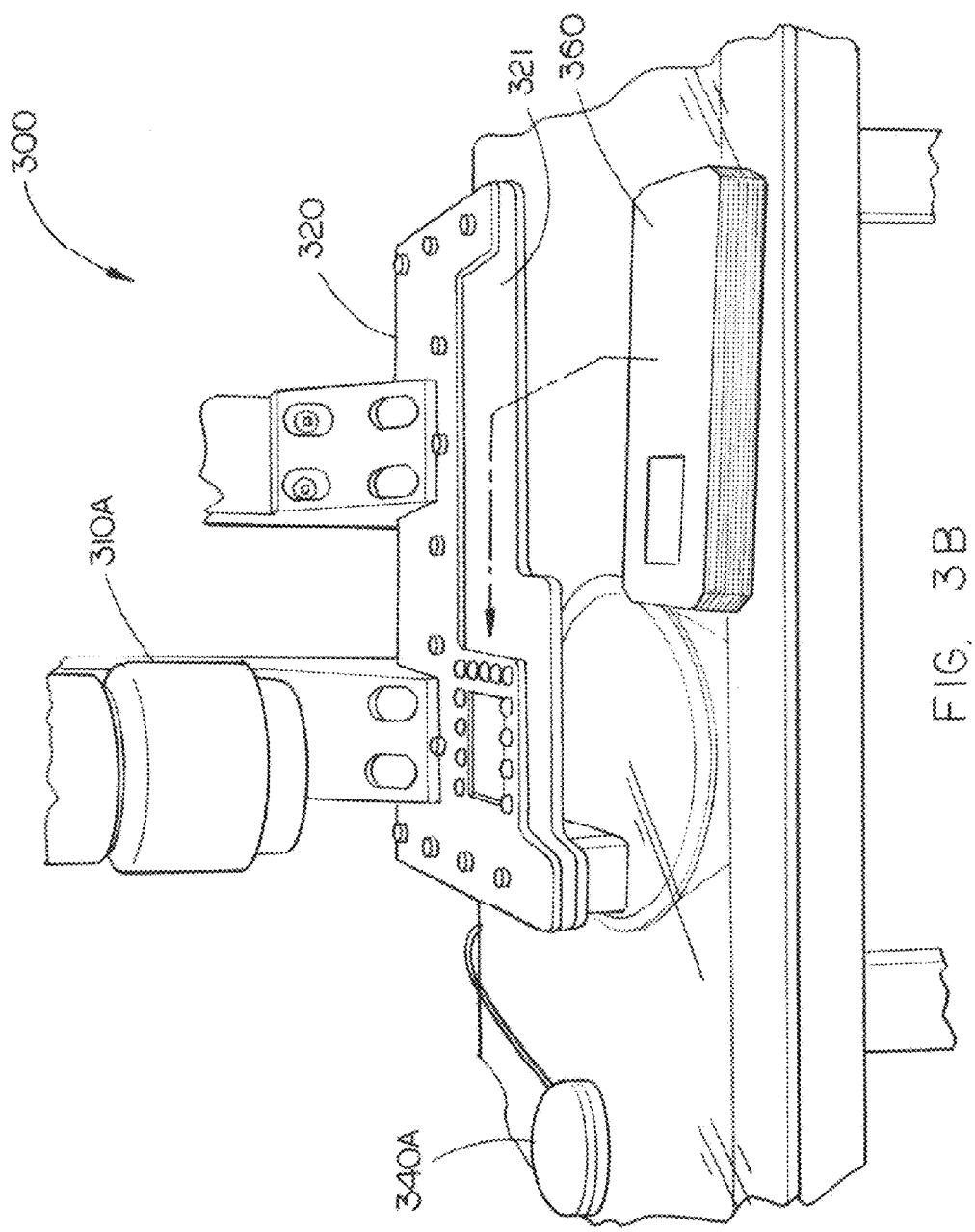

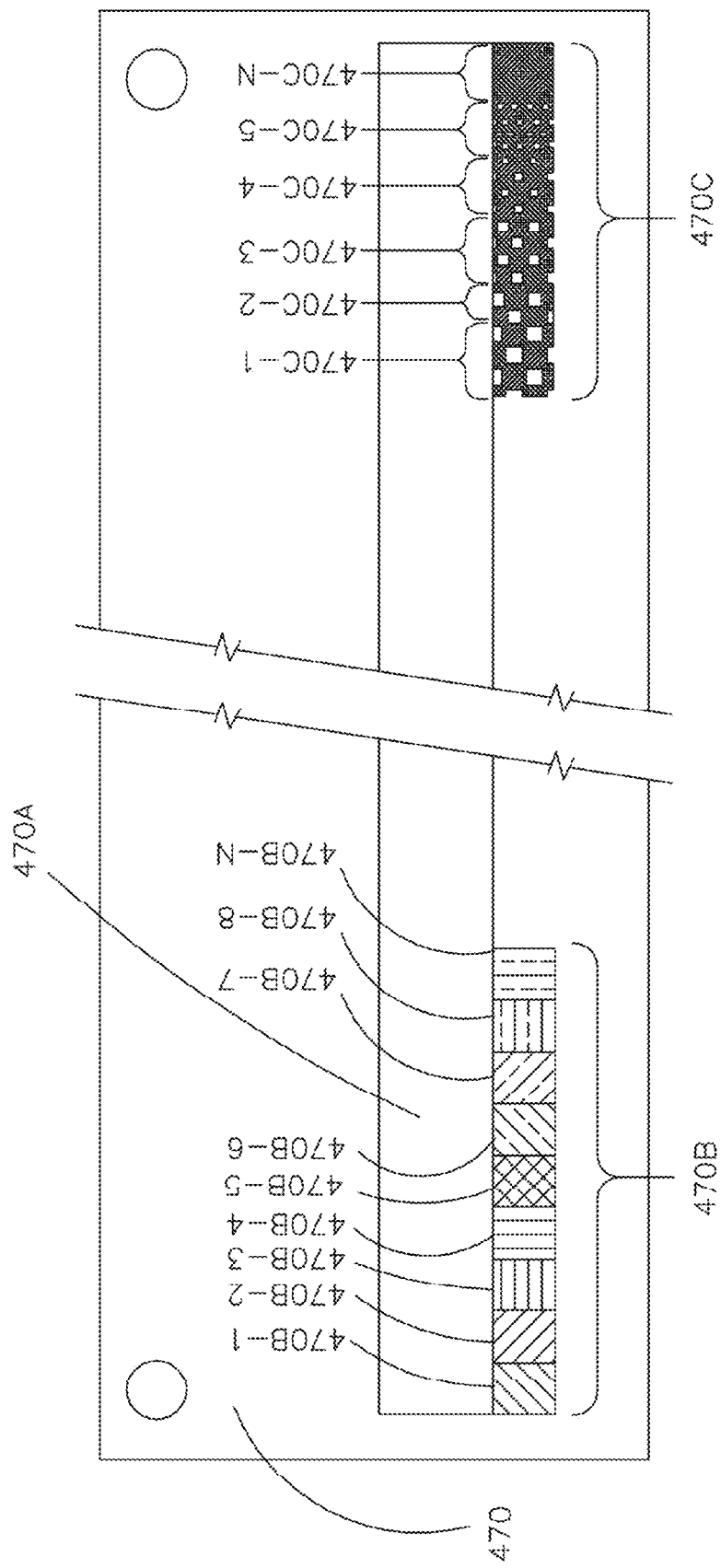

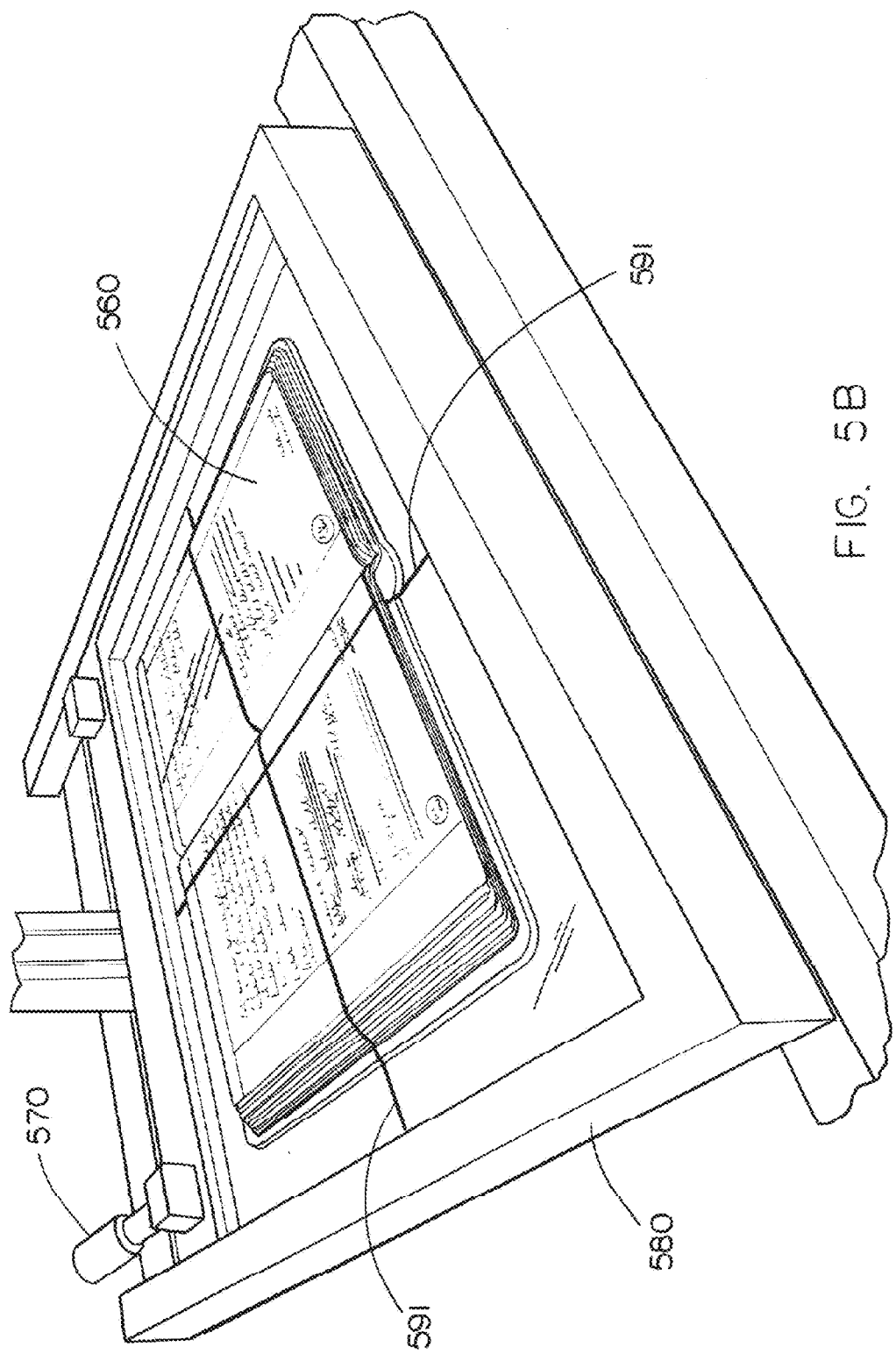

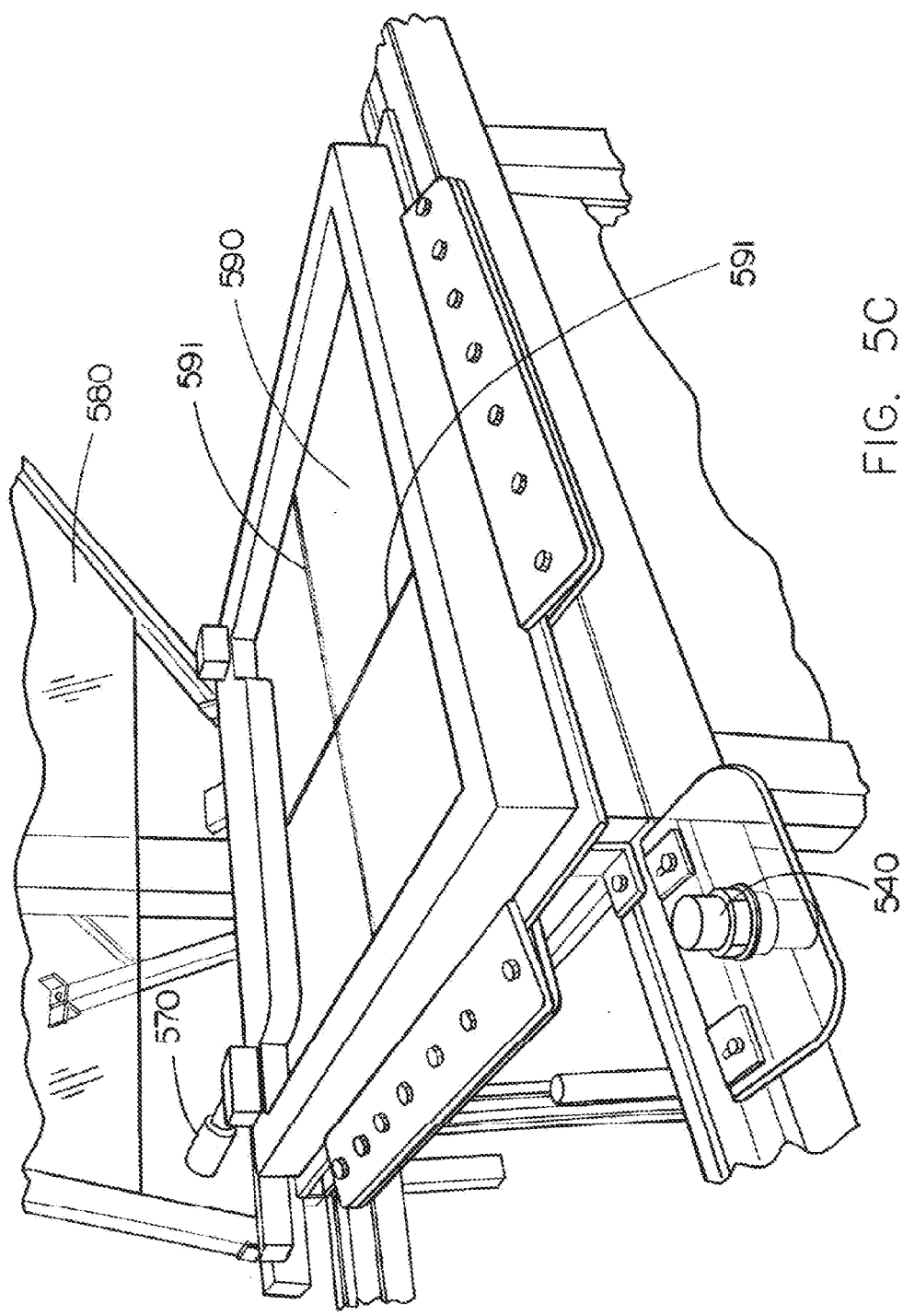

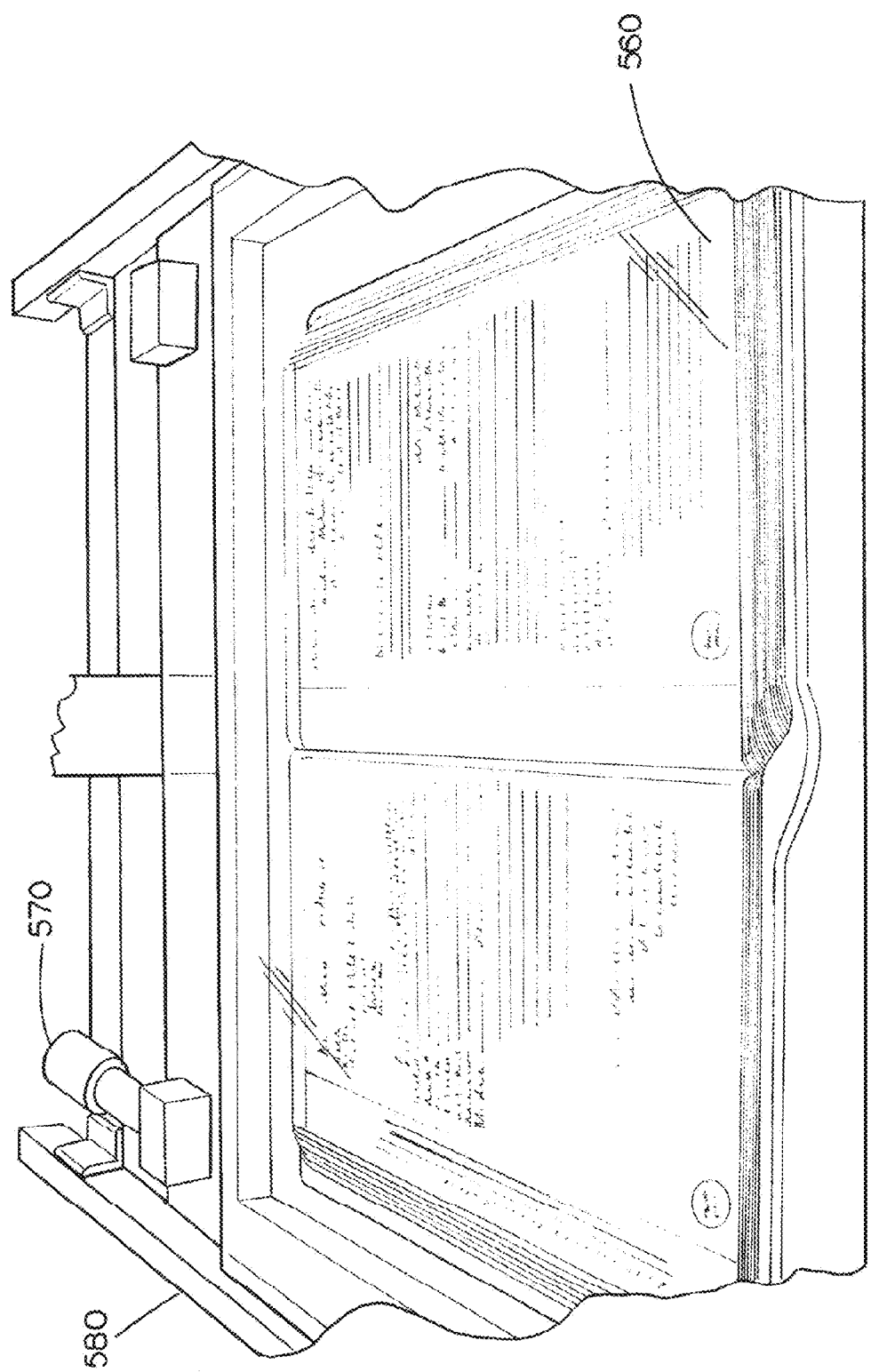

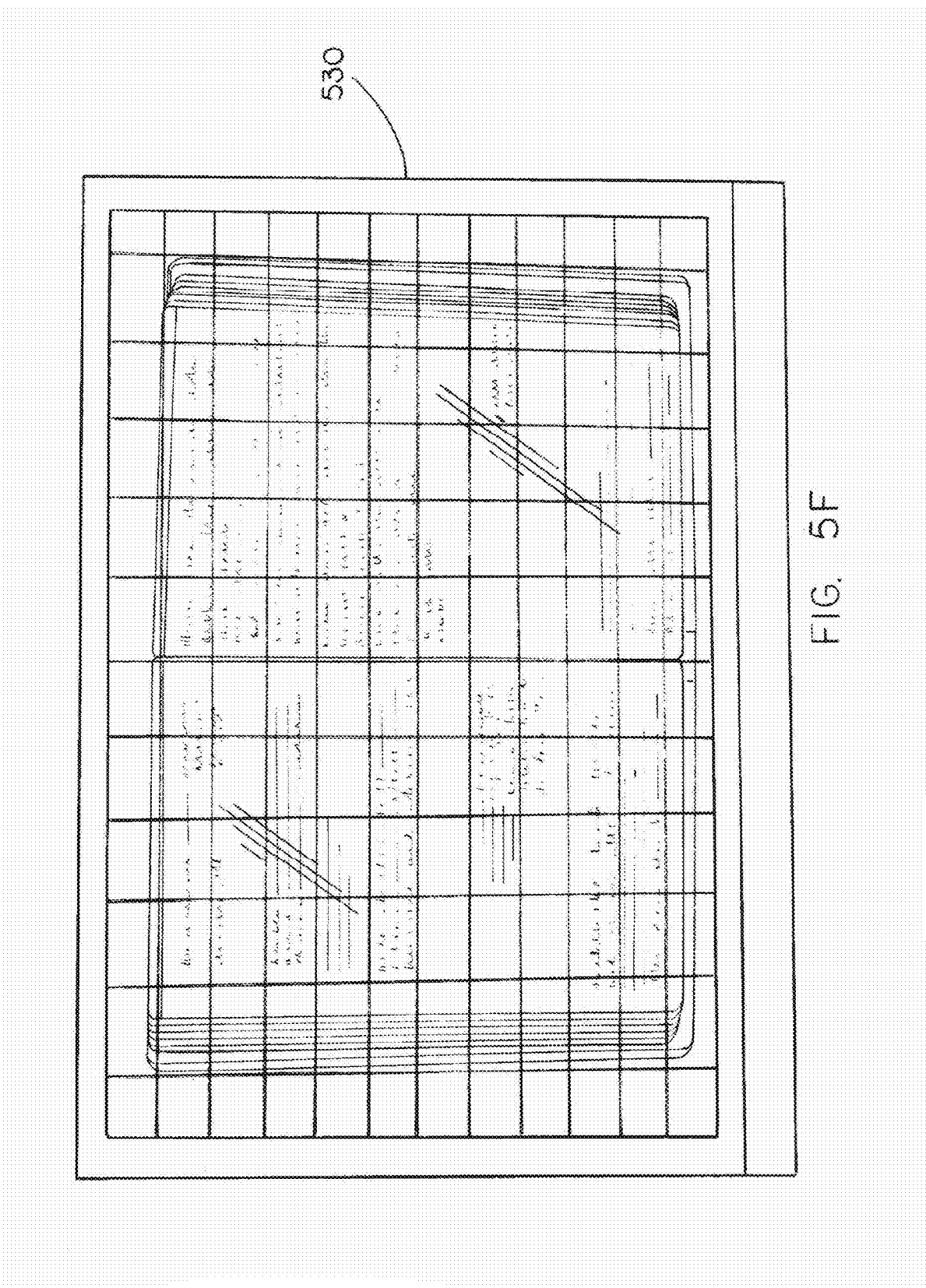

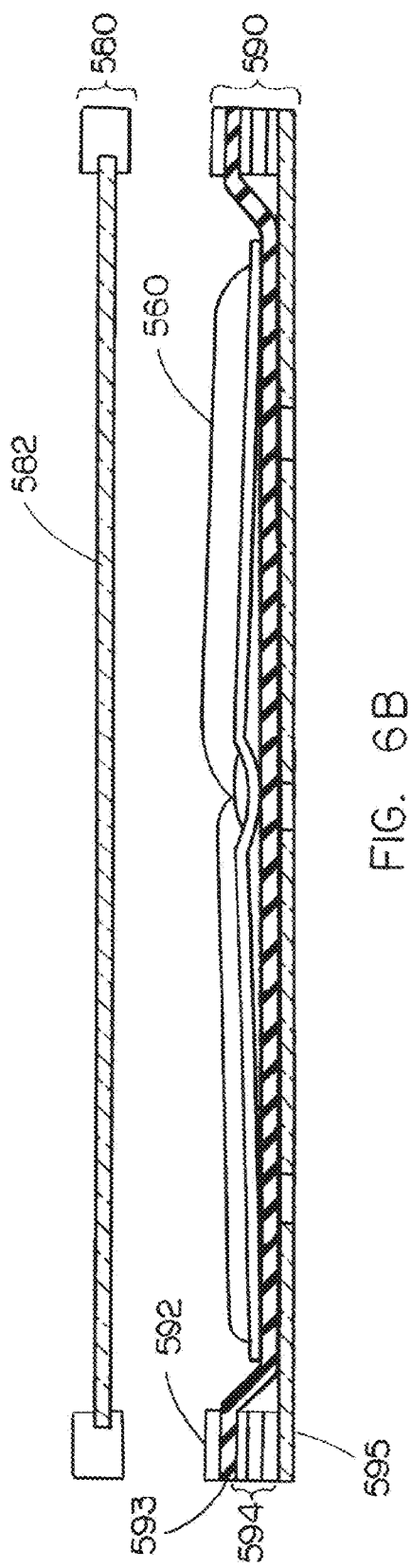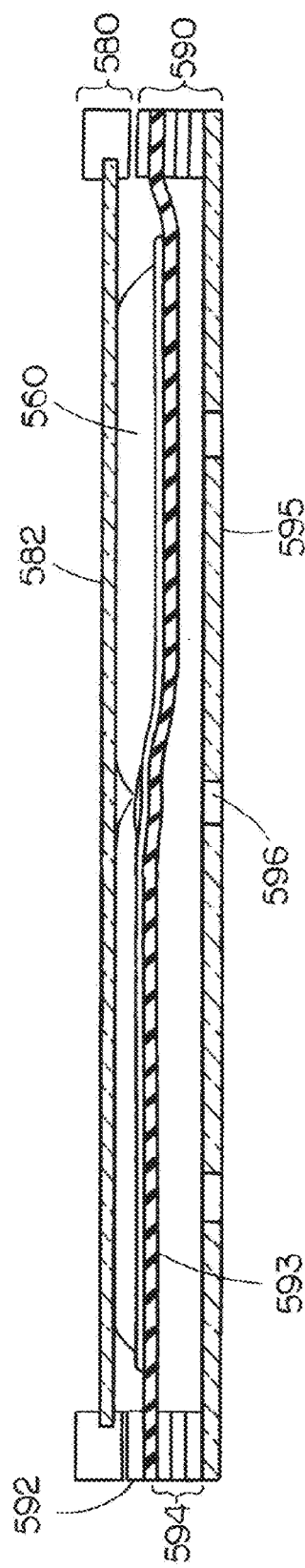

810 CREATING A NON-GRAVITATIONAL FORCE BETWEEN A DOCUMENT SURFACE OF A FIRST PORTION OF A PHYSICAL DOCUMENT AND A DOCUMENT SUPPORTING SURFACE OF AN IMAGING STATION

820 ATTAINING AT LEAST A SUBSTANTIAL DEGREE OF MECHANICAL EQUILIBRIUM BETWEEN THE DOCUMENT SURFACE OF THE FIRST PORTION OF THE PHYSICAL DOCUMENT AND THE DOCUMENT SUPPORTING SURFACE OF THE IMAGING STATION

830 PERFORMING AT LEAST ONE DOCUMENT SENSE OPERATION

840 REDUCING THE NON-GRAVITATIONAL FORCE BETWEEN THE DOCUMENT SURFACE OF THE FIRST PORTION OF THE PHYSICAL DOCUMENT AND THE DOCUMENT SUPPORTING SURFACE OF THE IMAGING STATION

850 PERFORMING AN ADDITIONAL OPERATION

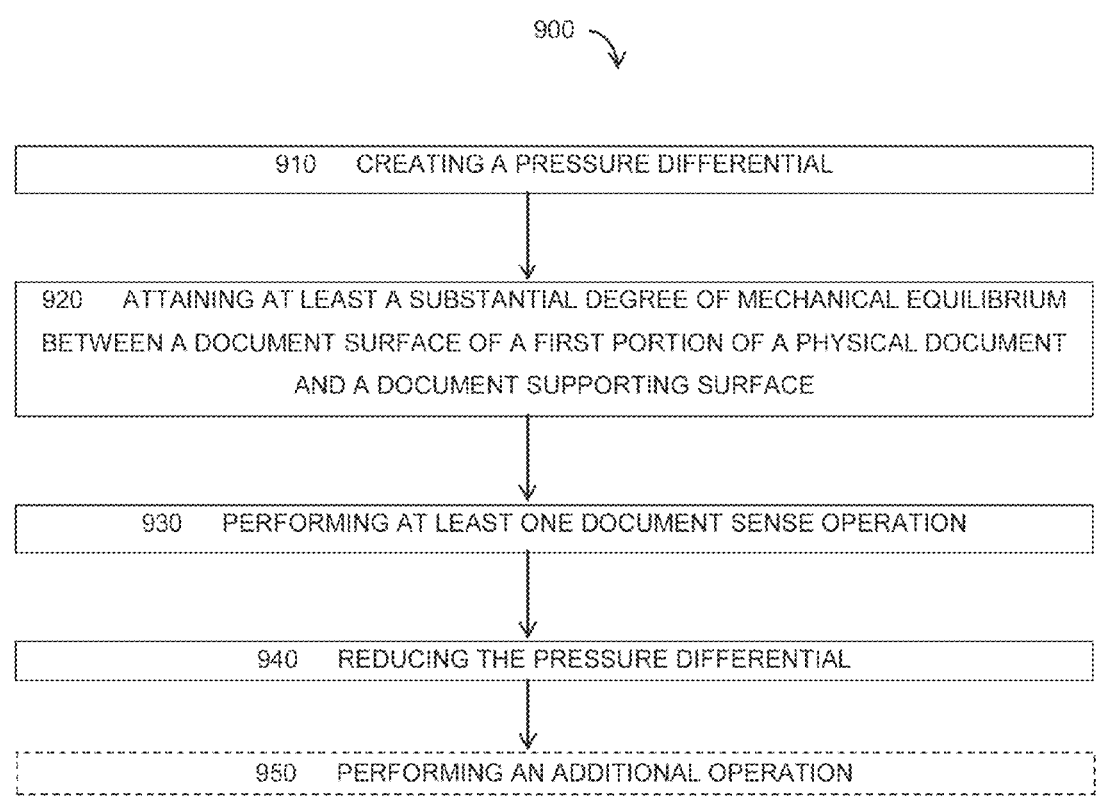

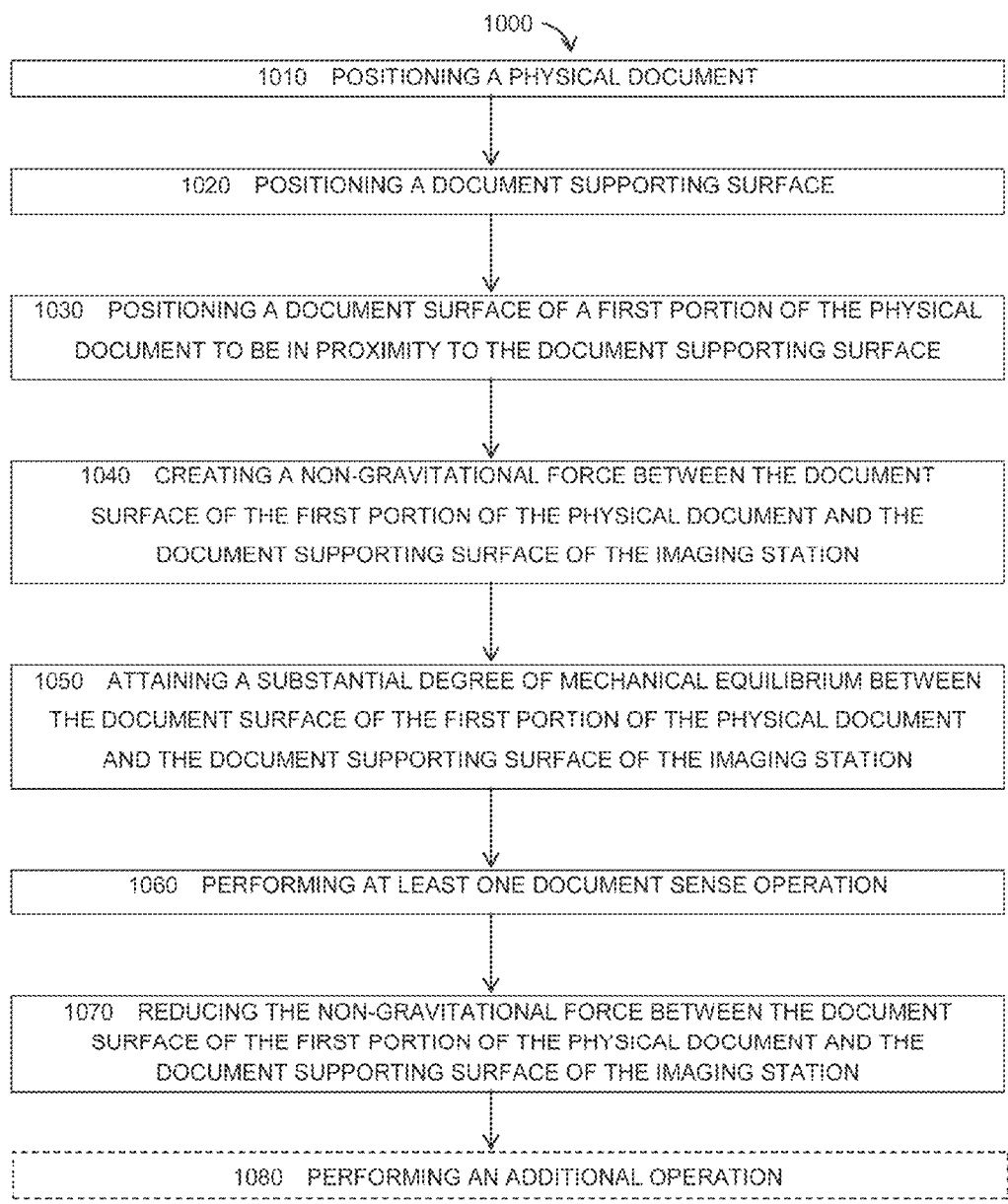

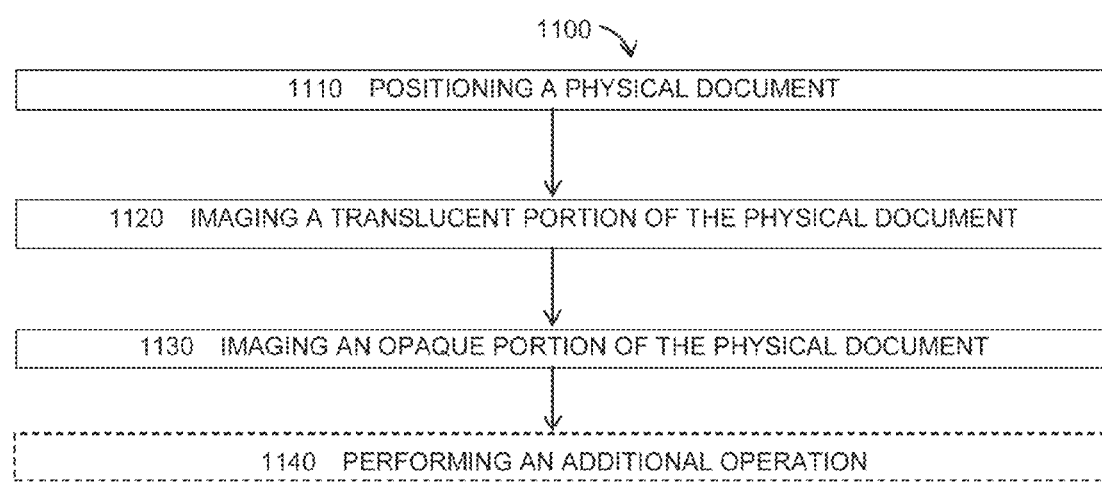

APPARATUS AND METHOD FOR IMAGING
PHYSICAL DOCUMENTS

CROSS-REFERENCE TO RELATED APPLICATIONS

This application claims the benefit under 35 U.S.C. §119 (e) of U.S. Provisional Application No. 61/786,886, filed on Mar. 15, 2013, and U.S. Provisional Application No. 61/824,834, filed May 17, 2013. U.S. Provisional Application Nos. 61/786,886 and 61/824,834 are herein incorporated by reference in their entirety.

The present application is related to U.S. patent application Ser. No. 14/216,489, filed on Mar. 17, 2014, which is herein incorporated by reference in its entirety.

FIELD

Embodiments of the invention are directed generally toward an apparatus and method for imaging physical documents.

SUMMARY

Accordingly, an embodiment includes a system. The system includes at least one camera and at least one computing device, the at least one computing device being communicatively coupled to the at least one camera, wherein the at least one computing device receives raw image data of physical document from the at least one camera.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which:

FIG. 1B shows a side view of a frame of the exemplary imaging station depicted in FIG. 1A;

FIG. 2B shows a further partial view of the further exemplary imaging station depicted in FIG. 2A;

FIG. 2D shows an additional partial view of the further exemplary imaging station depicted in FIG. 2A;

FIG. 2E shows a partial view of the further exemplary imaging station depicted in FIG. 2A;

FIG. 3B shows a partial view of the additional exemplary imaging station depicted in FIG. 3A;

FIG. 4D shows a top view of an exemplary control strip 470 suitable for use with some embodiments;

FIG. 5B shows a partial view of the further exemplary imaging station configured to image physical pages of a book depicted in FIG. 5A;

FIG. 5C shows a further partial view of the further exemplary imaging station configured to image physical pages of a book depicted in FIG. 5A;

FIG. 5E shows a further partial view of the further exemplary imaging station configured to image physical pages of a book depicted in FIG. 5A;

FIG. 5F shows another partial view of the further exemplary imaging station depicted in FIG. 5A;

FIG. 6B shows a cross-sectional view of a partially opened platen cover 580 and the book vacuum chamber 590 of the further exemplary imaging station, which is depicted in FIG. 5A;

FIG. 6C shows a cross-sectional view of a closed and sealed platen cover 580 and the book vacuum chamber 590 of the further exemplary imaging station, which is depicted in FIG. 5A;

FIG. 8 shows an exemplary method of some embodiments of the invention;

FIG. 9 shows a further exemplary method of some embodiments;

FIG. 10 shows a still further exemplary method of some embodiments of the invention;

FIG. 11 shows an additional exemplary method of some embodiments of the invention.

DETAILED DESCRIPTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include an apparatus, a system, and a method for digitally imaging physical media or physical documents (such as archival sheets, books, or microfiche cards), performing image processing, and/or creating a digital document. Some embodiments of the invention are configured to digitally image physical documents (such as archival documents (e.g., sheets, books, or microfiche cards)), create one or more digital documents, perform one or more digital document manipulations, perform one or more image processing operations, perform one or more optical character recognition (OCR) operations, or perform separation, combination, association, or manipulation operations among two or more data sources associated with features of embodiments, or perform other operations. For example, embodiments are configured to image a physical document and create an associated searchable text data structure associated with the digital image of the physical document.

Embodiments are configured to prevent errors (e.g., two images of a same physical document sheet or skipped sheets of a physical document). Some embodiments are configured to reduce vibration of the physical media during the imaging process and to increase stability. Some embodiments are configured to preserve the integrity of the physical documents and to prevent damage. Embodiments allow for quick and simple imaging which create easily organized digital document archives with searchable text fields.

Some embodiments include one or more imaging stations, where the imaging station includes one or more digital cameras, a document supporting mechanism or surface, one or more displays, one or more lights, an image activation mechanism, one or more computing devices, or the like. Additionally, some embodiments include one or more transparent vacuum insert assemblies, one or more vacuum or compressed air systems, or the like. The transparent vacuum insert assembly can be configured to stabilize physical documents by providing a vacuum effect to pull or hold the physical document flat against a transparent image surface. In some implementations, elements of the embodiments of the invention are communicatively coupled to one another. For example, a computing device and camera of an imaging station are communicatively coupled, and the computing device of the imaging station is communicatively coupled to a network.

Figure 1A:
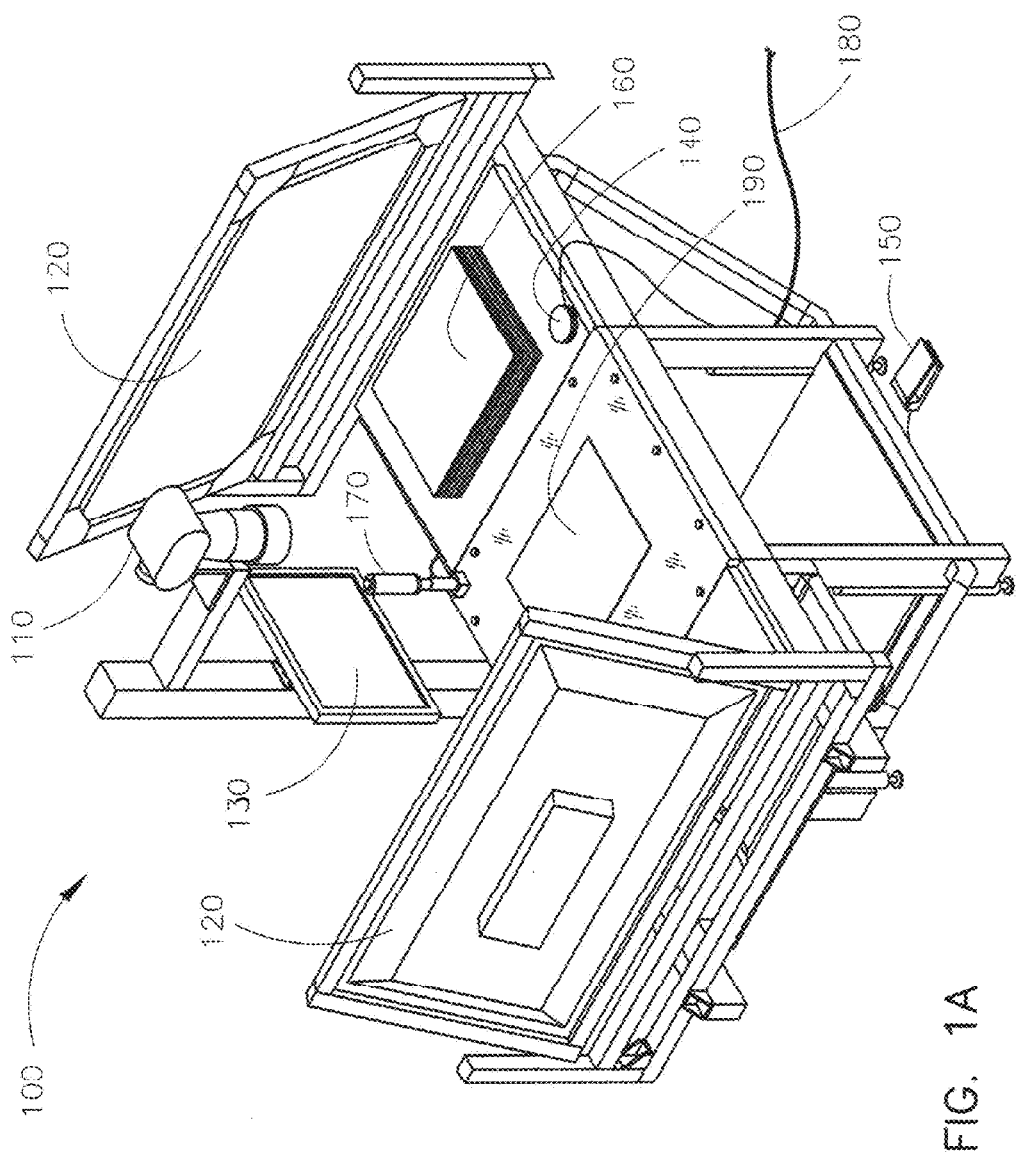
FIG. 1A shows a view of an exemplary imaging station configured to image physical documents.
Figure 1C:
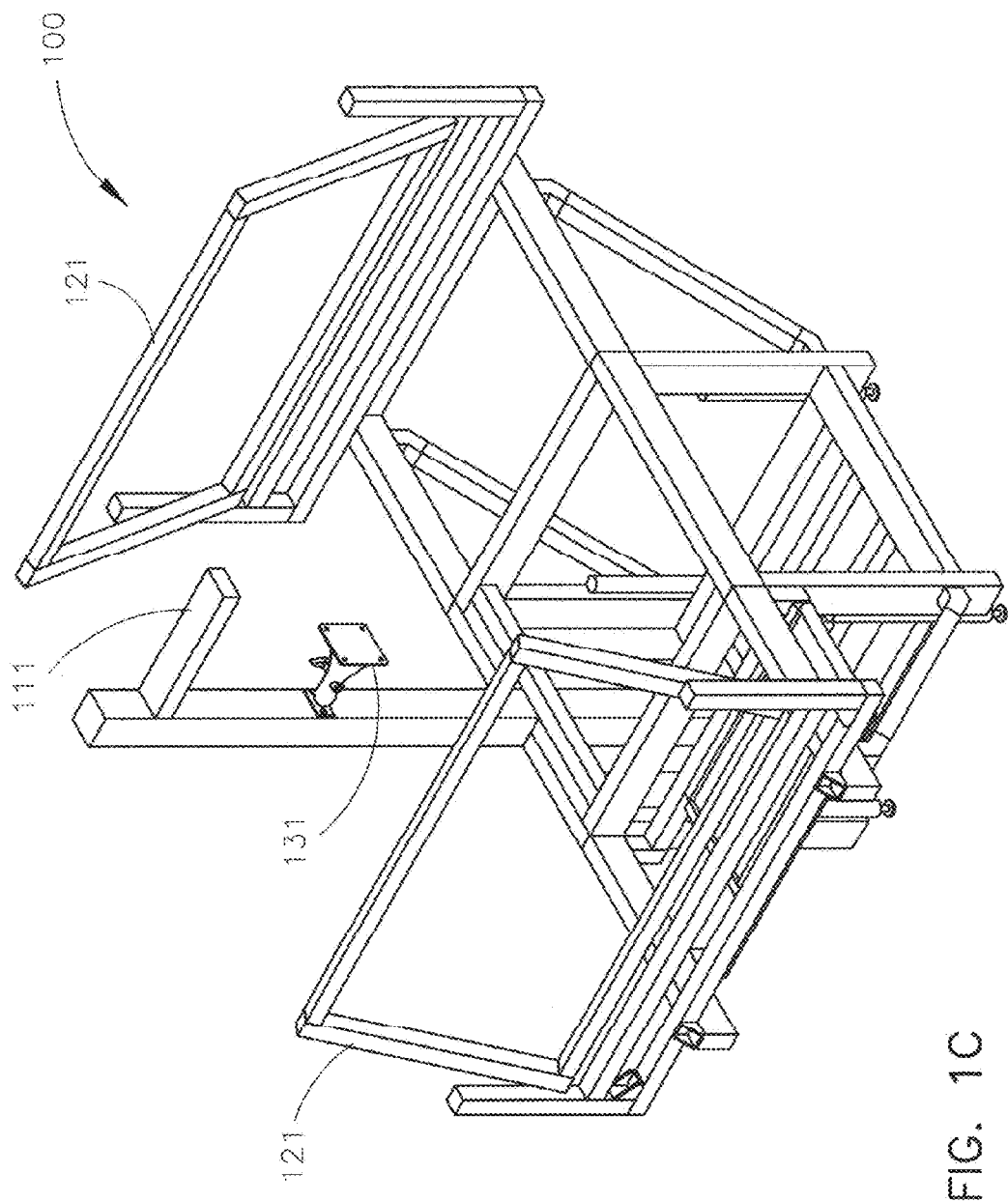
FIG. 1C shows an isometric view of a frame of the exemplary imaging station depicted in FIG. 1A.
Figure 1D:
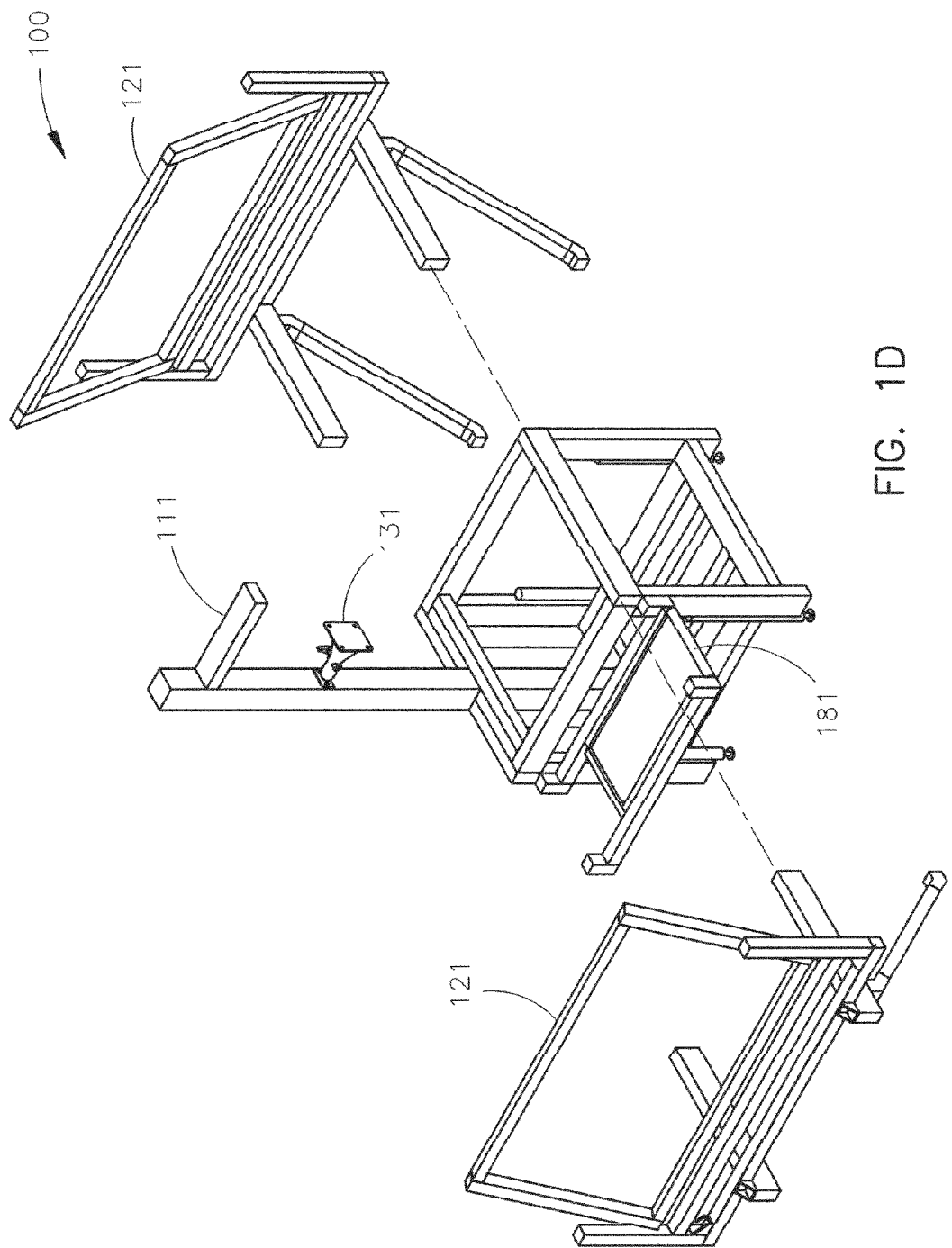
FIG. 1D shows an exploded view of a frame of the exemplary imaging station depicted in FIG. 1A.
Figure 2A:
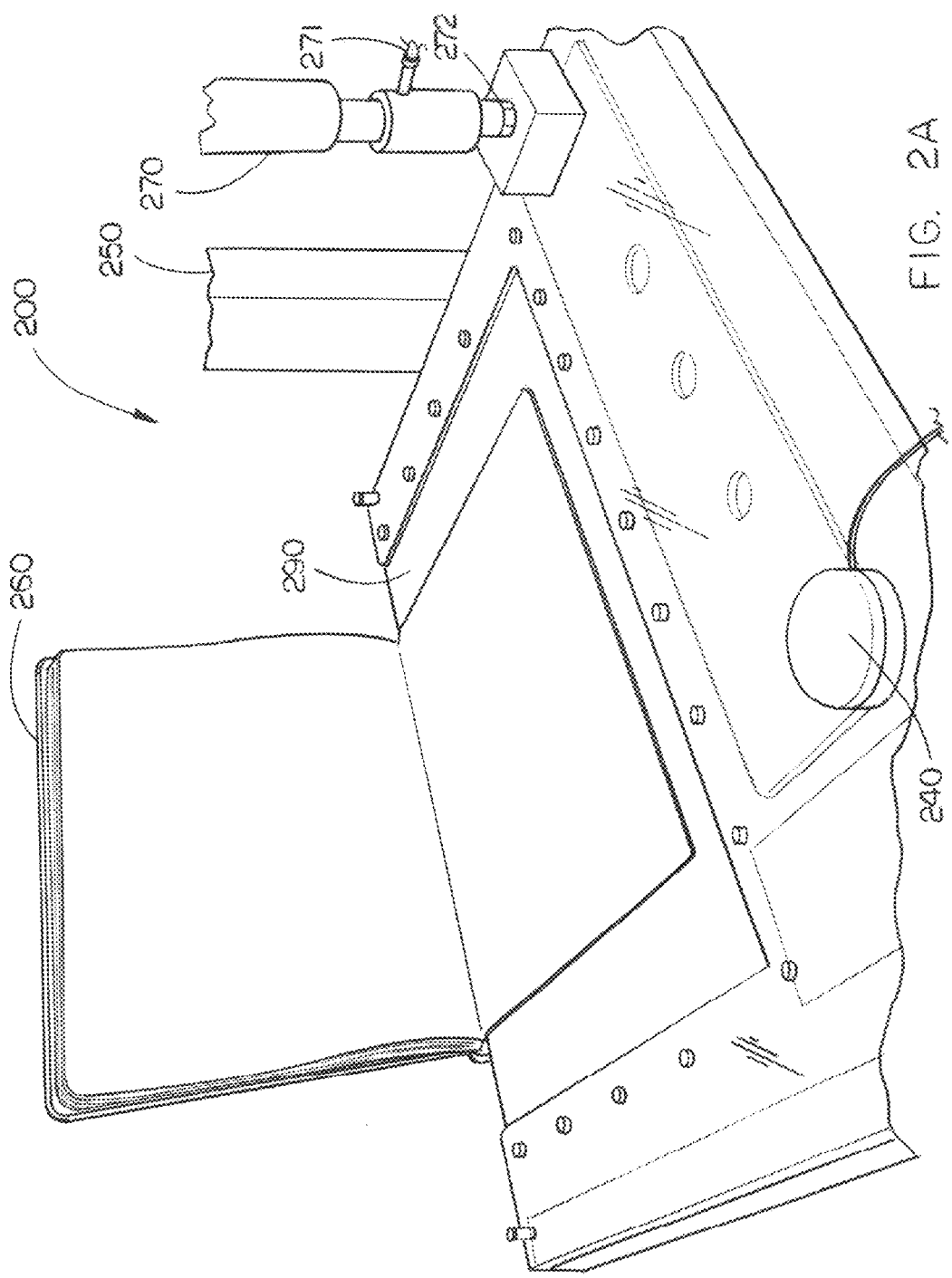
FIG. 2A shows a partial view of a further exemplary imaging station configured to image physical pages of a book.
Figure 2C:
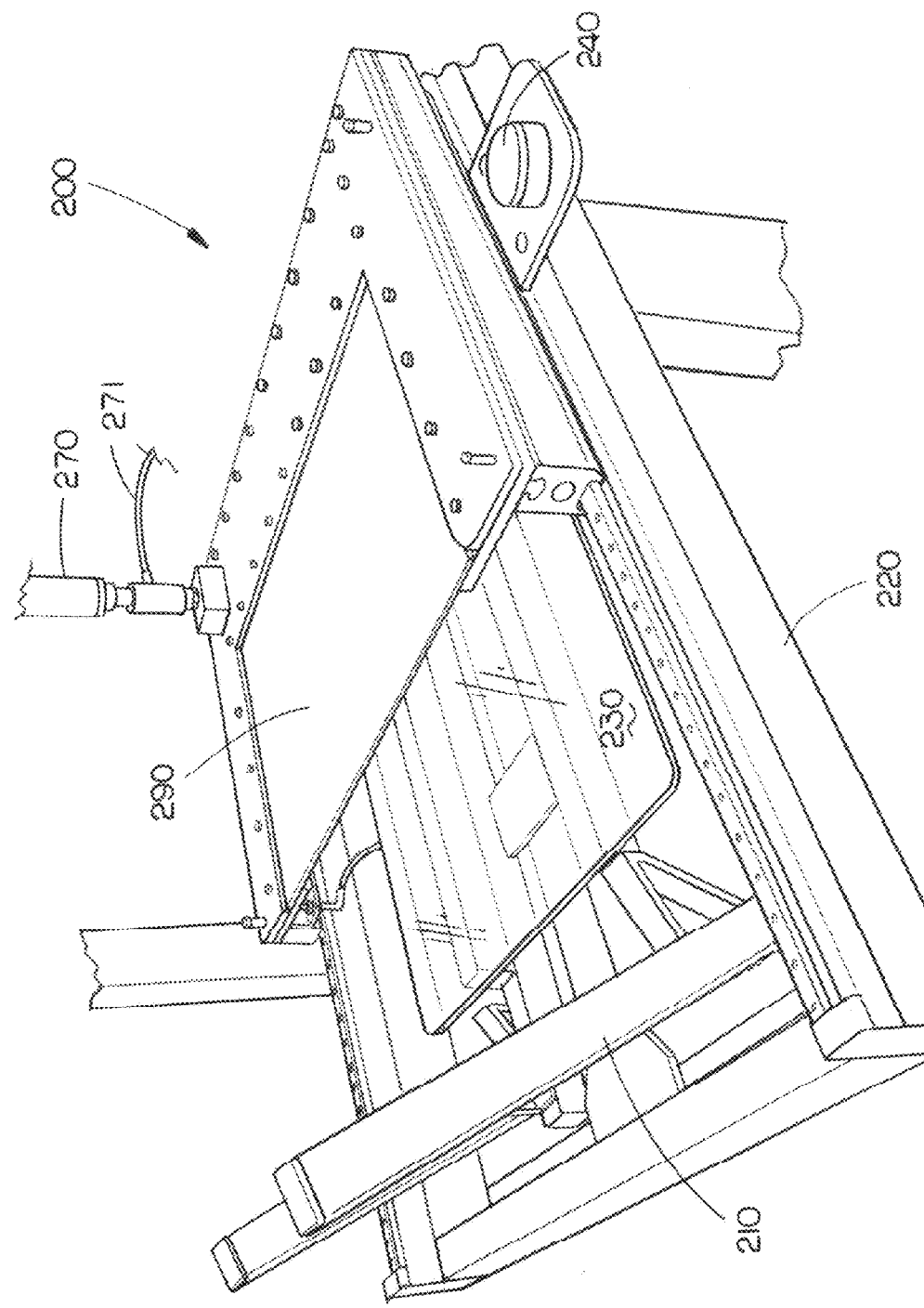
FIG. 2C shows an additional partial view of the further exemplary imaging station depicted in FIG. 2A.
Figure 3A:
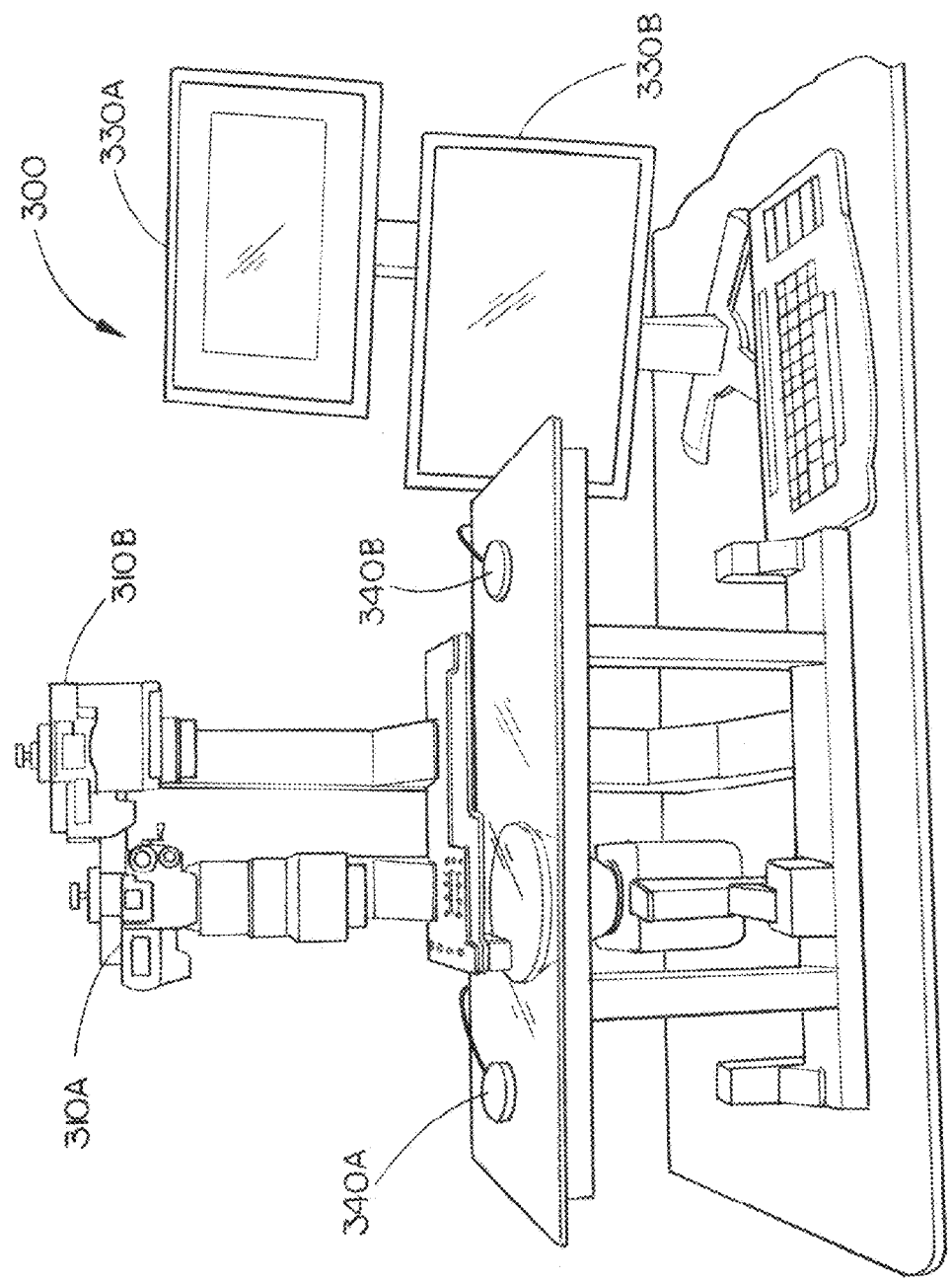
FIG. 3A shows a view of an additional exemplary imaging station configured to image microfiche cards.
Figure 3C:
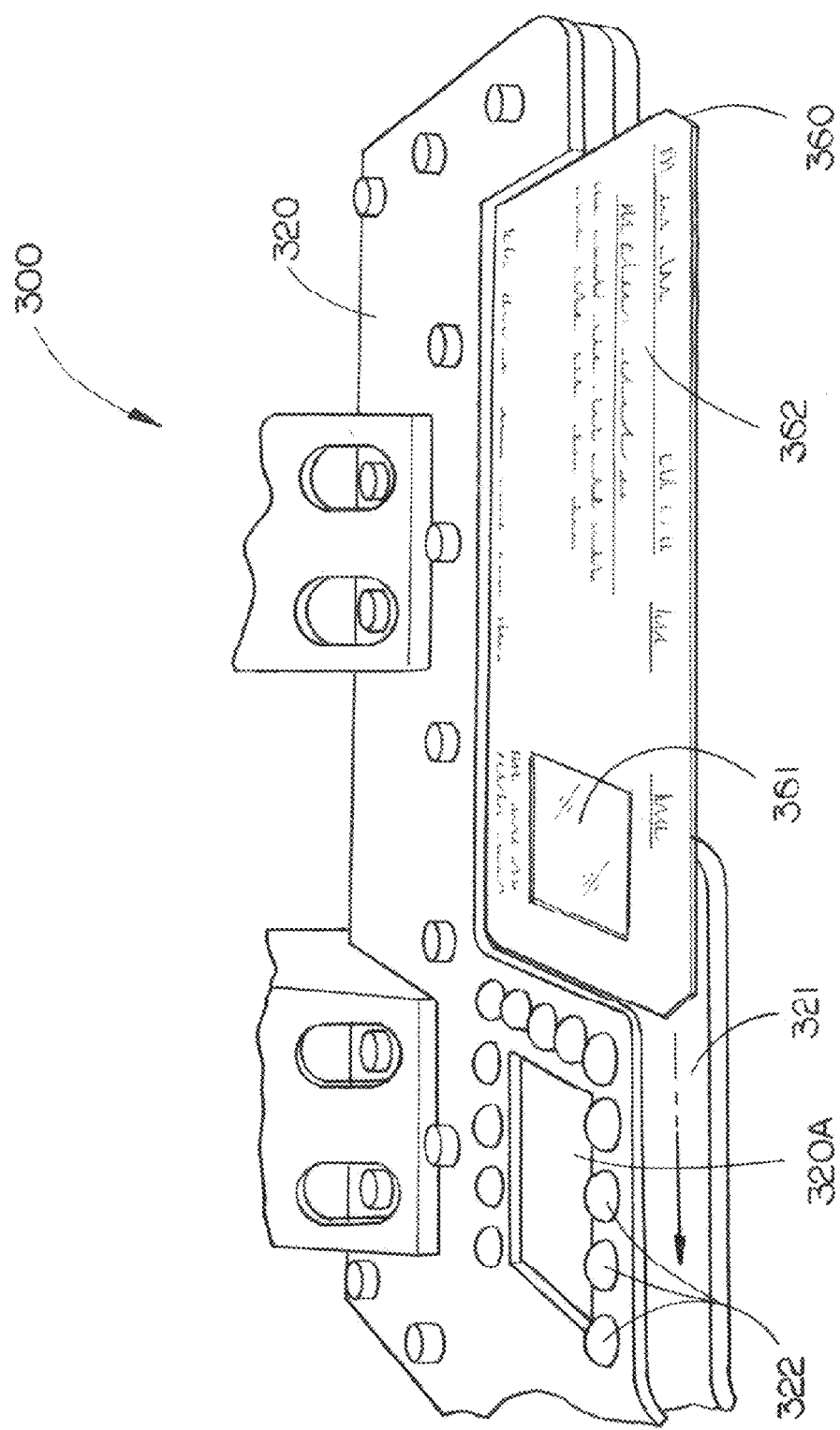
FIG. 3C shows a further partial view of the additional exemplary imaging station depicted in FIG. 3A.
Figure 3D:
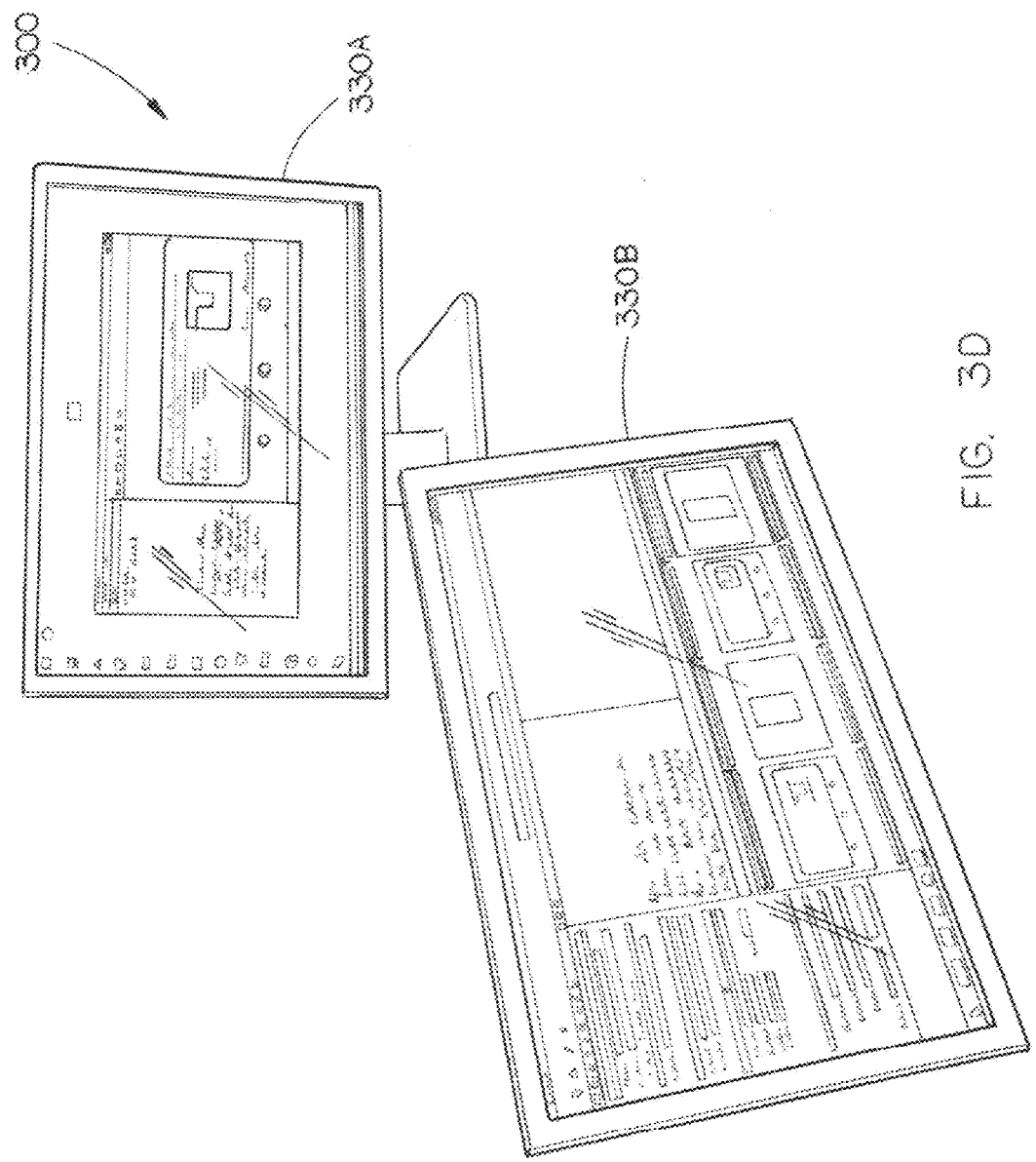
FIG. 3D shows an additional partial view of the additional exemplary imaging station depicted in FIG. 3A.
Figure 4A:
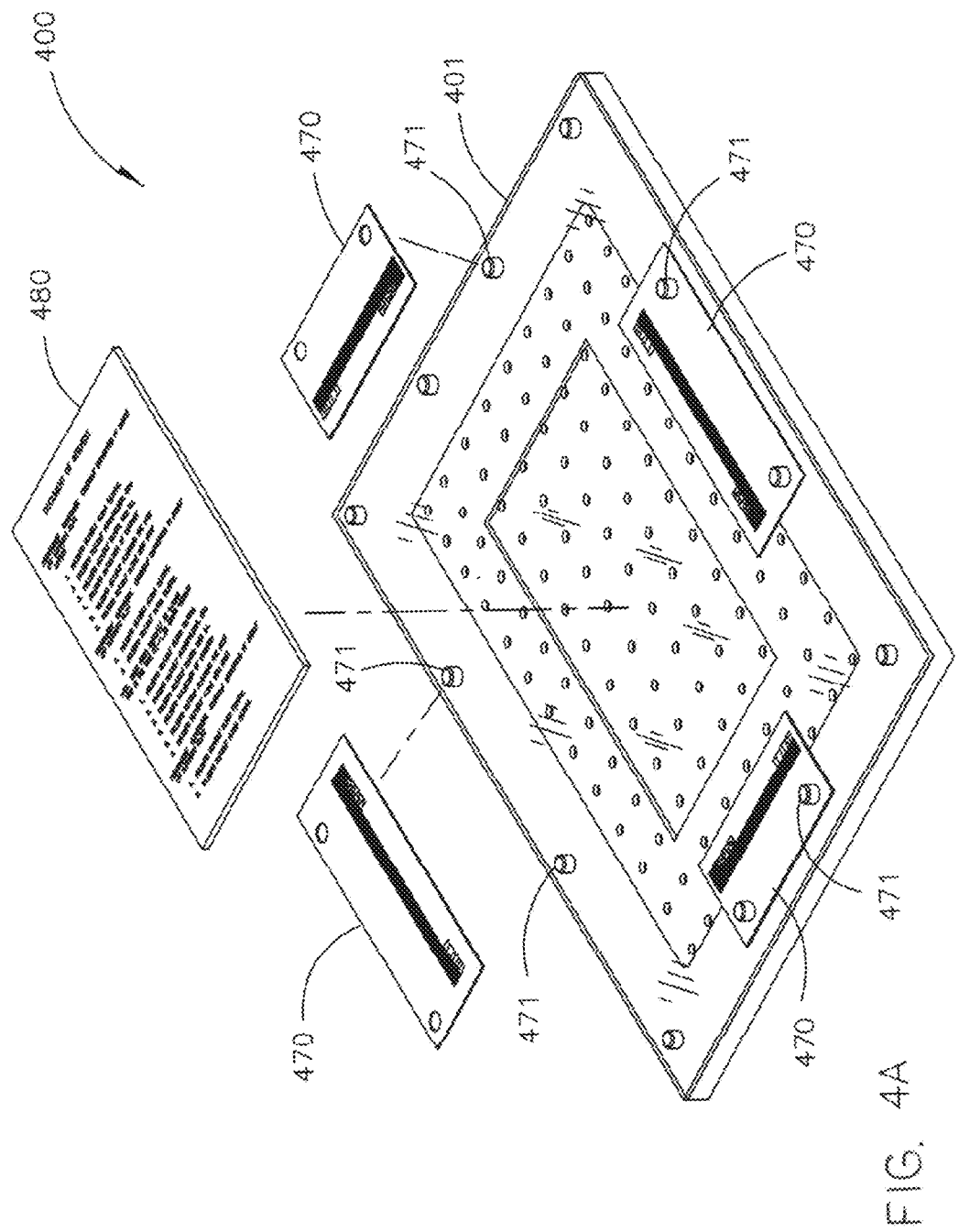
FIG. 4A shows an exemplary vacuum insert assembly of some embodiments.
Figure 4B:
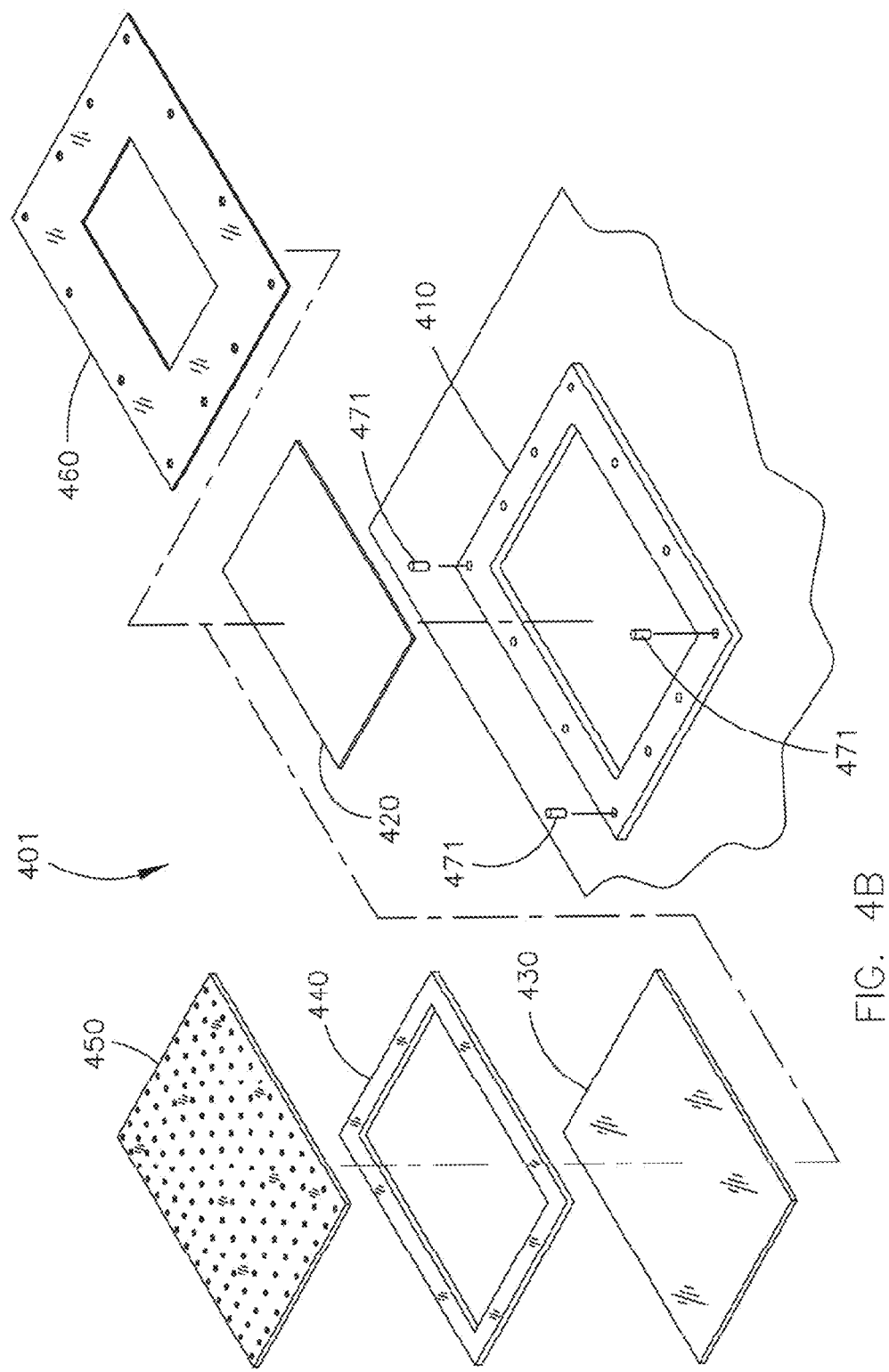
FIG. 4B shows components of the exemplary vacuum insert assembly depicted in FIG. 4A.
Figure 4C:
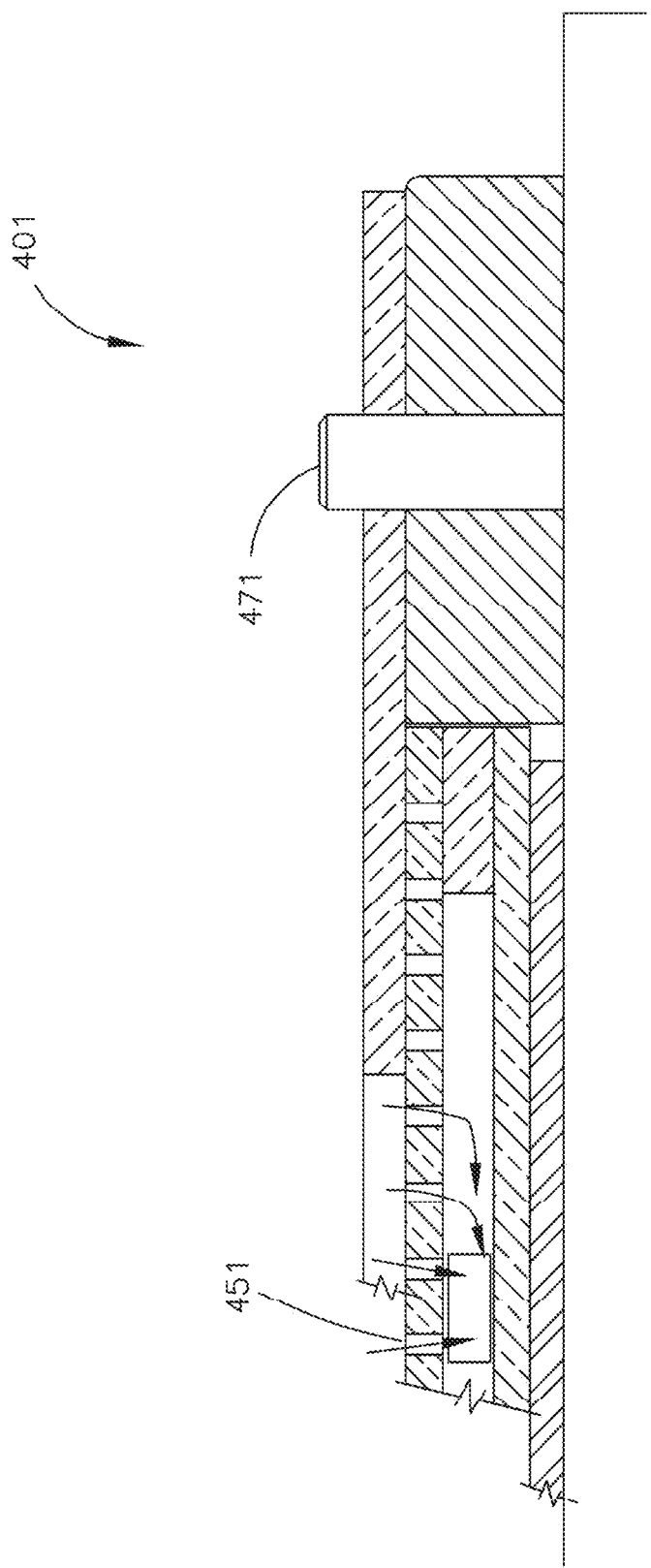
FIG. 4C shows a partial cross-sectional view of the exemplary vacuum insert assembly depicted in FIG. 4A.
Figure 5A:
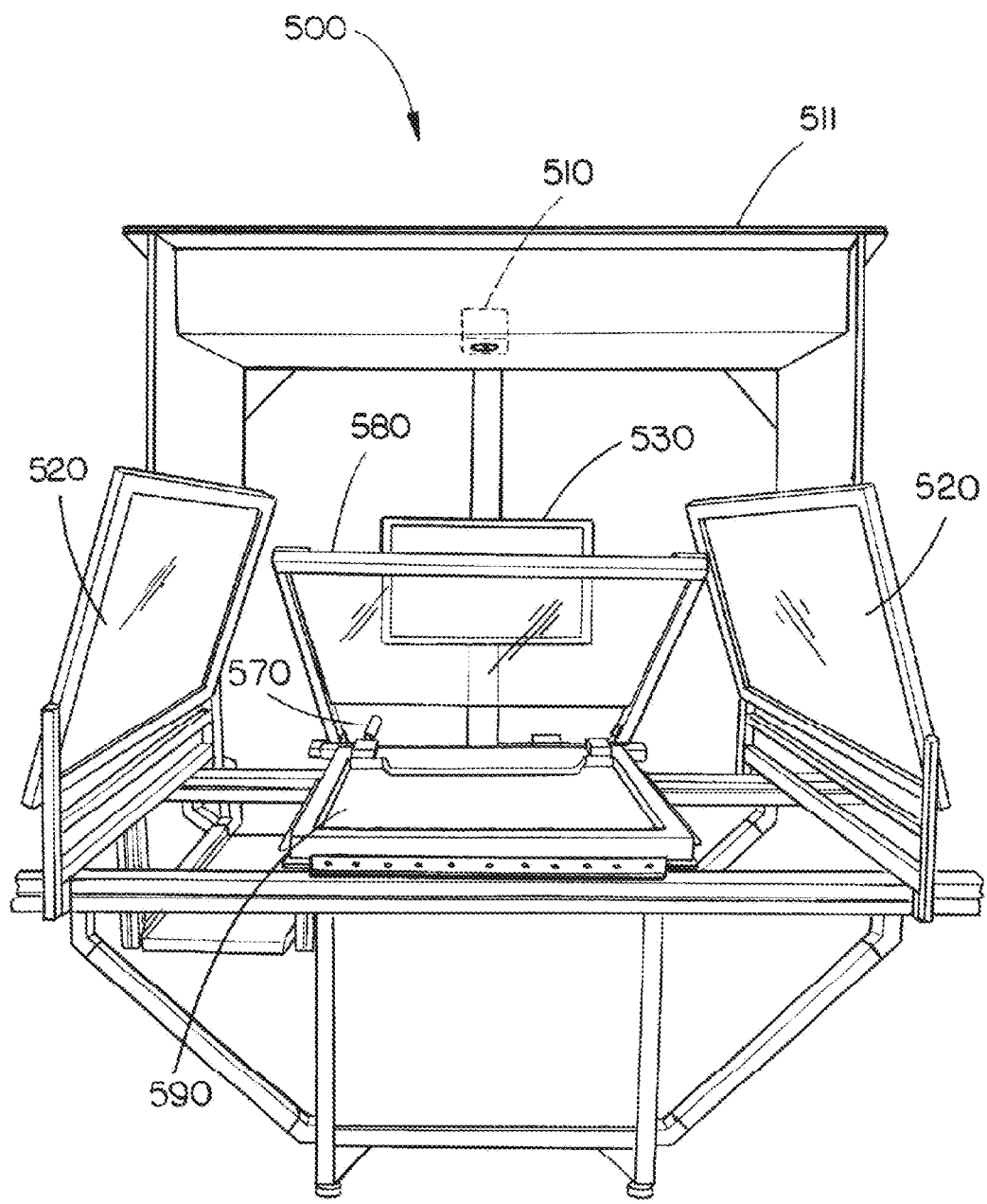
FIG. 5A shows a view of a further exemplary imaging station configured to image physical pages of a book.
Figure 5D:
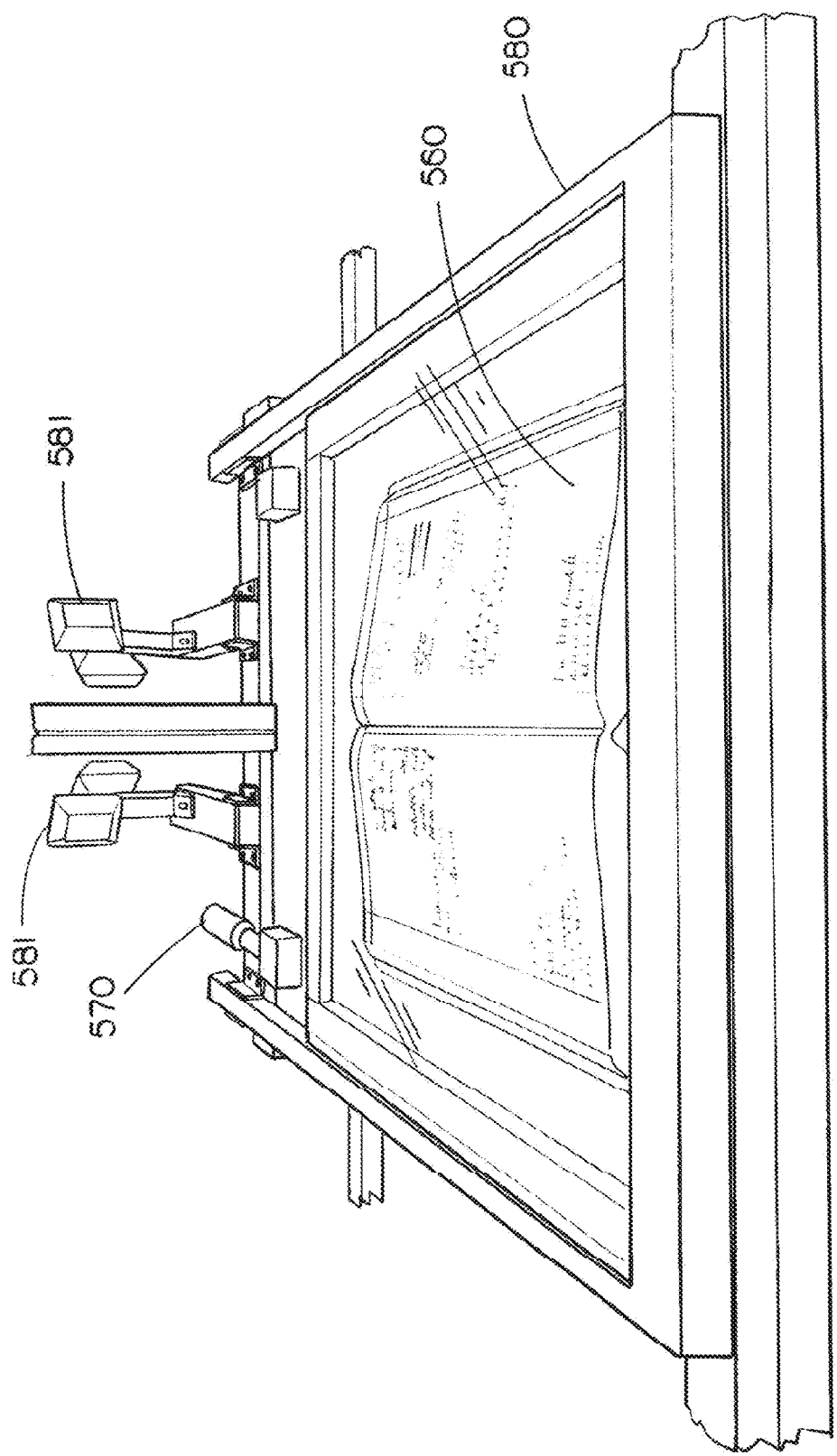
FIG. 5D shows an additional partial view of the further exemplary imaging station depicted in FIG. 5A.

Referring now to FIGS. 1A-1D, an exemplary imaging station 100 is depicted. Exemplary imaging station 100 is configured to image physical documents 160 (such as archival sheets). Some embodiments of the imaging station 100 include one or more digital cameras 110, one or more light panels 120, one or more displays 130, one or more activation buttons 140 configured to trigger the camera 110 to capture an image of a physical document, a document imaging area 190 (which may include a transparent vacuum insert assembly, such as depicted in FIGS. 4A-4C), an activation pedal 150, a compressed air connection 180, or the like. Some embodiments of the exemplary imaging station 100 include a modular frame structure with members configured to support elements of the imaging station. The frame can include light panel supports 121, display supports 131, camera supports 111, other support members 181, or the like.

Referring now to FIGS. 2A-2E, an exemplary imaging station 200 is depicted. Exemplary imaging station 200 is configured to image books 260. Some embodiments of the imaging station 200 include one or more digital cameras, one or more light panels, one or more displays, one or more activation buttons 240 configured to trigger the camera to capture an image of a physical document, a document imaging area 290 (which may include a transparent vacuum insert assembly, such as depicted in FIGS. 4A-4C), an activation pedal, or the like. Embodiments may additionally include a camera support 250. Embodiments may include a vacuum assembly 270 configured to create a lower differential pressure (e.g., a vacuum) within a transparent vacuum insert assembly to pull a page of a book 260 flat against the document imaging area 290. In some implementations, the vacuum assembly operates based upon the Venturi principle by flowing compressed air through a tee-apparatus, which includes an opening, a smaller opening 272, and side tee-branched tube 271; this effect creates a lower pressure (i.e., vacuum effect) in the tube 271; the tube 271 connects to the transparent vacuum insert assembly to create a vacuum effect which stabilizes a sheet of paper. In some embodiments, the document imaging area 290 includes one or more apertures 291 (such as elongated parallel apertures, round apertures, square apertures, or the like) as part of a transparent vacuum insert assembly. Additionally, the exemplary imaging station 200 includes a slide mechanism 220, whereby a portion of the apparatus can slide on a track to easily facilitate turning a page without removing the book from book support members (e.g., 210, 230) of the imaging station.

Referring to FIG. 2D-2E, some embodiments include a lift cylinder assembly 280 configured to raise or lower a book support 230. The lift cylinder assembly can be operated or powered through a compressed air (e.g., pneumatically driven) supply 281, 282. In some embodiments, the lift cylinder assembly 280 or the imaging station 200 includes a base 285.

Referring now to FIGS. 3A-3D, a further exemplary imaging station 300 is depicted. Exemplary imaging station 300 is configured to image microfiche cards 360 (which may include an image film portion 361 and a text portion 362). Some embodiments of the imaging station 300 include one or more digital cameras 310A, 310B, one or more light panels, one or more displays 330A, 330B, one or more activation buttons 340A, 340B each configured to trigger a particular camera to capture an image of a physical document, a document imaging area, or the like. In some embodiments, the exemplary imaging station 300 is configured to capture two images of a microfiche card 360, where a first image is captured of a portion of the microfiche card with the text portion 362, and wherein a second image is captured of a portion of the microfiche card 360 with the image film portion 361. For example, a user or an automated mechanism (such as a user-initiated automated mechanism, a process-initiated automatic mechanism (e.g., a computer-program-process-initiated automatic mechanism), a trigger-initiated automated mechanism, a semi-automated mechanism, or a fully automated mechanism) places the microfiche card 360 on a supporting surface 321; a first camera 310B images the text portion 362 of the microfiche card 360; the user or automated mechanism then slides the microfiche card 360 between a card supporting surface 321 and a second surface 320 (see, e.g., FIG. 3C); and the second surface 320 includes a window 320A, whereby the window 320A is configured to allow the second camera 310A to capture an image of the image film portion 361 of the microfiche card 360. Some embodiments include ball bearings 322 configure to reduce friction (and reduce or eliminate potential damage that could be caused to archival microfiche cards during imaging) of sliding a microfiche card 360 between the supporting surface 321 and the second surface 320.

Referring now to FIGS. 4A-4C, views of an exemplary transparent vacuum insert assembly 401 of an exemplary transparent vacuum insert system 400 of some embodiments are depicted. In some embodiments, the transparent vacuum insert assembly 401 includes a frame 410 (which may be comprised of metal, plastic, acrylic, wood, carbon-fiber, fiber glass, or the like), one or more control strips 470, pins 471, an "out of gamut" substrate 420 (e.g., which may comprise a blue, green, or a magenta screen or surface), as well as other layers 430, 440, 450, 460. In some embodiments, the vacuum insert assembly 401 is a transparent open-face vacuum insert assembly configured to support, stabilize, and exert suction on (e.g., when the vacuum is activated) a document 480.

Referring now to FIGS. 4B-4C, in some embodiments, the metal frame 410 includes holes (which exemplarily may be holes having a diameter of ¼ inch), wherein the holes are configured to receive a plurality of pins 471. In some embodiments, the pins 471 are configured to align the various layers (e.g., 410, 430, 440, 450, 460), and the pins 471 are configured to receive (e.g. register with or align with) the holes of the color strip 470.

Still referring to FIGS. 4B-4C, in some embodiments, the transparent vacuum insert assembly 401 comprises three or more layers 430, 440, 450 (e.g., sheets or partial sheets) of transparent acrylic. For example, a bottom layer 430 may comprise a solid sheet; a middle layer 440 may comprise an outside frame or border; and a top layer 450 may comprise a perforated sheet or sheet with a plurality of holes 451. For example, the three or more layers 430, 440, 450 may be stacked such that a hollow void exists is between the top layer 450 and the bottom layer 430, wherein air may be pulled or drawn through the holes of the top layer 450 when a vacuum is activated.

Additionally, in some embodiments, the transparent vacuum insert assembly 401 further comprises a transparent template layer 460. For example, the transparent template layer 460 may include a rectangular document window (which may be cut out of the template layer 460). The document window of the transparent template layer 460 may be of various sizes to accommodate documents 480 of any size. When the transparent template layer 460 is laid on top of the transparent vacuum insert assembly 401, the surface of the transparent template layer 460 which borders the document window is configured to block the perforations/holes of the top layer 450 which would otherwise be exposed to open air when a document is placed within the document window; this allows suction to pull the document flat against the top layer 450 of the transparent vacuum insert assembly 401 when the vacuum is activated.

Referring again to FIG. 4B, in some embodiments, the "out of gamut" substrate 420 comprises a brightly colored surface or screen, such as bright blue, bright green, or a magenta screen or surface. In some embodiments, the bright color of the "out of gamut" substrate 420 improves the ability of the imaging process to visually separate the live documents from the background of the apparatus. In some embodiments, the "out of gamut" substrate 420 is configured to reside within the boundaries of the frame 410 and rest upon an underlying surface which supports the frame; this allows a particular "out of gamut" substrate 420 to interchangeably be swapped for a differently colored "out of gamut" substrate without having to open the transparent vacuum insert assembly 401.

In some embodiments, the transparent vacuum insert assembly 401 is inserted within the frame 410 and on top of the "out of gamut" substrate 420. Additionally, the transparent template layer 460 may be placed on top of the transparent vacuum insert assembly such that the holes along the edges of the transparent template layer 460 register with pins 471.

Referring now to FIG. 4D, an exemplary control strip 470 of some embodiments is shown. Holes of control strips 470 are configured to register with pins 471 placed along the edges of the transparent vacuum insert assembly 401 of some embodiments or along a document imaging area of other imaging stations of some embodiments. In some embodiments (for example, as shown in FIG. 4A), four control strips 470 are placed along the sides of the transparent vacuum insert assembly 401. The control strips 470 may be placed in a precise location of the live imaging area and assists the image capture and image processing process in locating and measuring components of images. In some embodiments, each control strip includes a solid color bar 470A (e.g., a black bar), a color bar 470B, and a light-dark pattern bar 470C. The solid color bar 470A may have a known length and width, which allows an imaging process measure size and location. The color bar 470B may have a plurality of color areas (e.g., color blocks 470B-1, 470B-2, 470B-3, 470B-4, 470B-5, 470B-6, 470B-7, 470B-8, 470B-N) with each color block being a known different color at known location relative to the solid color bar 470A; for example, in a particular embodiment, the color bar 470B includes an arrangement of color blocks, which include dark gray, gray, light gray, red, magenta, yellow, green, indigo, and blue. The light-dark pattern bar 470C may include a pattern of progressively tighter (e.g., coarser to finer pattern tightness) light-dark patterns. The color bar 470B has a known location relative to the solid color bar 470A. In exemplary embodiments, the light-dark pattern bar 470C comprises a black-white pattern bar with a progressively tighter checker pattern (e.g., a series of checker block pattern sections, wherein each subsequent checker block pattern section in a particular direction along the light-dark pattern bar 470C has a smaller checker pattern). For example, the light-dark pattern area (e.g., the light-dark pattern bar 470C) includes a plurality of segments (e.g., 470C-1, 470C-2, 470C-3, 470C-4, 470C-5, 470C-N) arranged linearly from a first side of the light-dark pattern area to an opposite side of the light-dark pattern area, each of the plurality of segments including a geometrically similar repeating pattern of light pixel areas and dark pixel areas, wherein a size of each light pixel area and each dark pixel area of each particular segment progressively decreases from the first side of the light-dark pattern area to the opposite side of the light-dark pattern area. The light-dark pattern bar 470C has a known location relative to the solid color bar 470A. The control strips 470 may be used as known and static inputs (e.g., predetermined and known size, position, color, color arrangement, and known color patterns, the like) by the imaging process to locate and measure components of the imaging process as well as for measuring the integrity and quality of each image captured by the camera. In some embodiments, each side of the transparent vacuum insert assembly 401 is configured to receive and is associated with a unique control strip 470 which can be identified and utilized throughout the imaging process. Referring now to FIGS. 5A-5F, a further exemplary imaging station 500 configured to simultaneously image two pages of a book 560 is depicted. Some embodiments of the imaging station 500 include one or more digital cameras 510, a camera hood assembly 511, one or more light panels 520, one or more displays 530, one or more activation buttons 540 configured to trigger the camera to capture an image of two pages of a book 560, an activation pedal, a vacuum assembly 570, a transparent platen cover assembly 580, a book vacuum chamber assembly 590, one or more positioning lasers configured to emit a laser pattern 591 (such as a cross-hair pattern; a grid pattern; a pattern comprised of points, curves, and/or lines; or the like) onto a document imaging area of the book vacuum chamber assembly 590, or the like.

In some embodiments, the vacuum assembly 570 is configured to create a lower differential pressure (e.g., a vacuum) between the transparent platen cover assembly 580 and the book vacuum chamber assembly 590 to lift a flexible sheet 593, which supports a book 560, such that two pages of the book 560 are pulled flat against the bottom surface of a transparent portion 582 (e.g., a tempered glass portion) of the transparent platen cover assembly 580. In some implementations, the vacuum assembly 570 may operate based upon the Venturi principle by flowing compressed air through a tee-apparatus, which includes an opening, a smaller opening, and side tee-branched tube; this effect creates a lower pressure (i.e., vacuum effect) in the tube; the tube connects to the book vacuum chamber assembly 590 to create a vacuum effect. When the vacuum assembly 570 is activated, the vacuum effect draws the flexible sheet 593 (e.g., such as a gum rubber sheet, a neoprene sheet, a nylon sheet, a Kevlar sheet, a polyester sheet, or the like) and the book 560 resting upon the flexible sheet 582 toward and against the bottom surface of the transparent portion 582 of the transparent platen cover assembly 580.

In some embodiments, the transparent platen cover assembly 580 is attached (e.g., via hinges) to one or more portions of the imaging station 500 along a pivot axis such that the transparent platen cover assembly 580 can swing to an open position or swing to a closed or sealed position with respect to the book vacuum chamber assembly 590. When the transparent platen cover assembly 580 is in a closed or sealed position with respect to the book vacuum chamber assembly 590, surfaces along a frame of the transparent platen cover assembly 580 may abut a top layer 592 of the book vacuum chamber assembly 590 to create an air seal (e.g., a semi-permeable or impermeable air seal) configured to maintain a pressure differential, when the vacuum assembly 570 is activated, between (a) a space between the transparent platen cover assembly 580 and the book vacuum chamber assembly 590, and (b) outside of the space between the transparent platen cover assembly 580 and the book vacuum chamber assembly 590. In some embodiments, the transparent platen cover assembly 580 includes a transparent portion 582 (e.g., glass, such as tempered glass) configured to allow high-quality images of one or more pages (e.g., one page or two pages simultaneously) of a book 560 to be imaged by a camera. In some embodiments, the transparent platen cover assembly 580 includes one or more counterweights 581 configured to balance (or reduce the imbalance) the weight or torque of the transparent platen cover assembly 580 on each side of the pivot axis so as to reduce the amount of force required to move the transparent platen cover assembly 580 between open and closed positions.

Figure 6A:
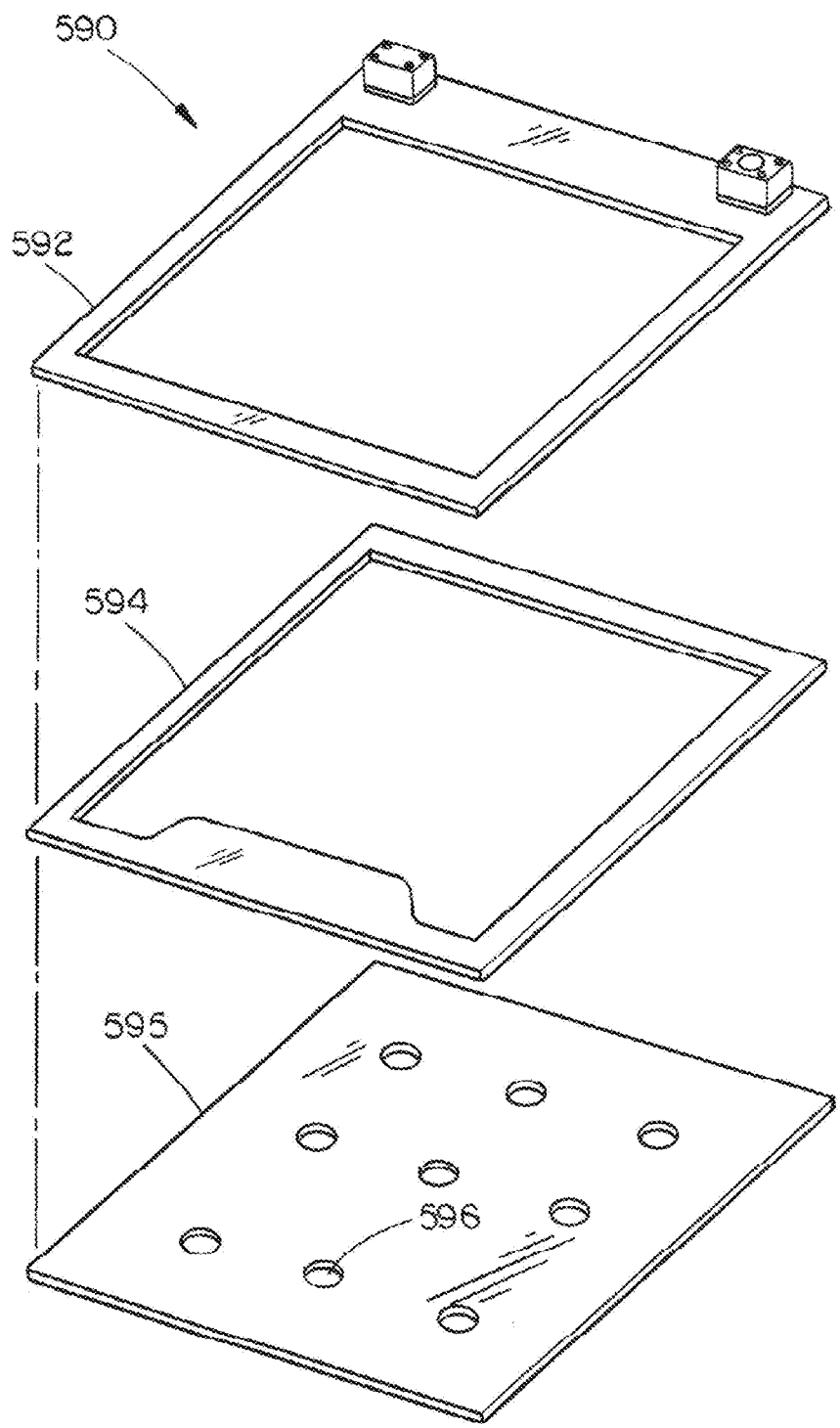
FIG. 6A shows a partial exploded view of a book vacuum chamber 590 of the further exemplary imaging station, which is depicted in FIG. 5A.

Referring now to FIG. 6A, an exploded view of some exemplary portions of the book vacuum chamber assembly 590 of the imaging station 500 of some embodiments is depicted. For example, the book vacuum chamber assembly 590 may include a top layer 592, a flexible sheet 593 (as shown in FIGS. 6B-C), one or more spacers 594, and a bottom layer 595. In a particular embodiment, the top layer 592, one or more spacers 594, and the bottom layer 595 may be comprised of acrylic; however, in other exemplary embodiments, the top layer 592, one or more spacers 594, and the bottom layer 595 may be comprised of any suitable material or materials. Additional spacers 594 can be added or removed to accommodate different thicknesses of books; for example, an exemplary implementation, which includes four spacers 594, may accommodate books over four inches thick; as such, the exemplary embodiment allows for easily imaging of even the first few pages when the left side of the book may be ⅛" thick and the right side may be 4" thick. In some embodiments, the bottom layer 595 includes one or more apertures 596 configured to allow air to flow freely through the one or more apertures 596 of the bottom layer 595 such that an atmospheric pressure acts on the bottom side of the flexible sheet 593.

Referring now to FIGS. 6B-6C, exemplary cross-section views of the platen cover assembly 580 and the book vacuum chamber 590 of some embodiments of the imaging station 500 are depicted.

FIG. 6B shows an exemplary cross-sectional view of a partially opened platen cover assembly 580 and the book vacuum chamber 590 of the imaging station 500 of some embodiments. As shown in FIG. 6B, the platen cover assembly 580 is in a partially open position with a gap between the platen cover assembly 580 and the book vacuum chamber 590. In some embodiments, when the vacuum assembly 570 is deactivated the flexible sheet 593 is stretched downward against the bottom layer 595 (as shown) due to the weight of the book 560; while in other embodiments, the flexible sheet may be configured to support sufficient tensile forces such that the flexible sheet 593 remains suspended above the bottom layer 595 even when supporting the book 560. In exemplary embodiments, the vacuum assembly 570 is deactivated when the platen cover assembly 580 is in an open position/raised position.

In some implementations, the flexible sheet 593 is porous, perforated, or includes apertures configured to let some air through the flexible sheet 593; in implementations which the flexible sheet 593 is porous, perforated, or includes apertures, the flexible sheet 593 is configured to allow some air to pass through the flexible sheet 593 but still maintain a pressure differential (between the sealed/closed book vacuum chamber assembly and outside the flexible sheet 593) sufficient to lift the book 560 toward the bottom surface of the transparent portion 582 of the transparent platen cover assembly 580 when the vacuum assembly 570 is activated. In other implementations, the flexible sheet 593 is substantially air tight such that only a negligible amount of air permeates the flexible sheet 593.

Referring now to FIG. 6C, an exemplary cross-sectional view of a closed and/or sealed platen cover assembly 580 and the book vacuum chamber 590 of the imaging station 500 of some embodiments is shown. Once the platen cover assembly 580 is in a closed and sealed position, a user or automated process (e.g., upon detection of the platen cover assembly 580 being in a closed position) can trigger the activation of the vacuum assembly 570 to vacuum air from a space between the platen cover assembly 580 and the book vacuum chamber 590. As the air is vacuumed out of the space, the flexible sheet 593 raises up and conforms to the shape of the book 560 and the pages of the book 560 are flattened and pressed against the bottom of the transparent portion 582 of the platen cover assembly 580. As the book 560 is pressed against the bottom surface of the transparent portion 582 of the transparent platen cover assembly 580, the pages of the book 560 are substantially flattened into a single focal plane along the surface of the transparent portion 582 of the transparent platen cover assembly 580. Pressing the pages of the book 560 into the single focal plane improves the quality of images to be captured by the camera 510 and reduces sources of image distortion along the center spine of the book where the pages of an opened book meet.

Once the pages of the book 560 are imaged by the camera 510, a vacuum cycle progresses towards completion, and the vacuum assembly 570 is deactivated causing the book 560 and the flexible sheet 593 to drop down and away from the transparent platen cover assembly 580 (to a state as similarly shown in FIG. 6B). Once vacuum assembly 570 is deactivated, the transparent platen cover assembly 580 may be raised (e.g., by a user, an automated process, or a mechanized process). Once the transparent platen cover assembly 580 is raised, the position laser may emit a laser pattern 591 onto the book 560 and/or flexible sheet 593 (e.g., as shown in FIG. 5C) for setting up another image capture of the book 560, and a new imaging cycle/vacuum cycle can begin.

Exemplary embodiments of the imaging station 500 are configured to accommodate and operate with books weighing as much as 20 pounds or more. Additionally, exemplary imaging stations 500 is configured to perform an imaging cycle of positioning and imaging two pages of a book 560 every 12 seconds or less (which results in at least 300 images per hour or at least 600 pages per hour).

Figure 7A:
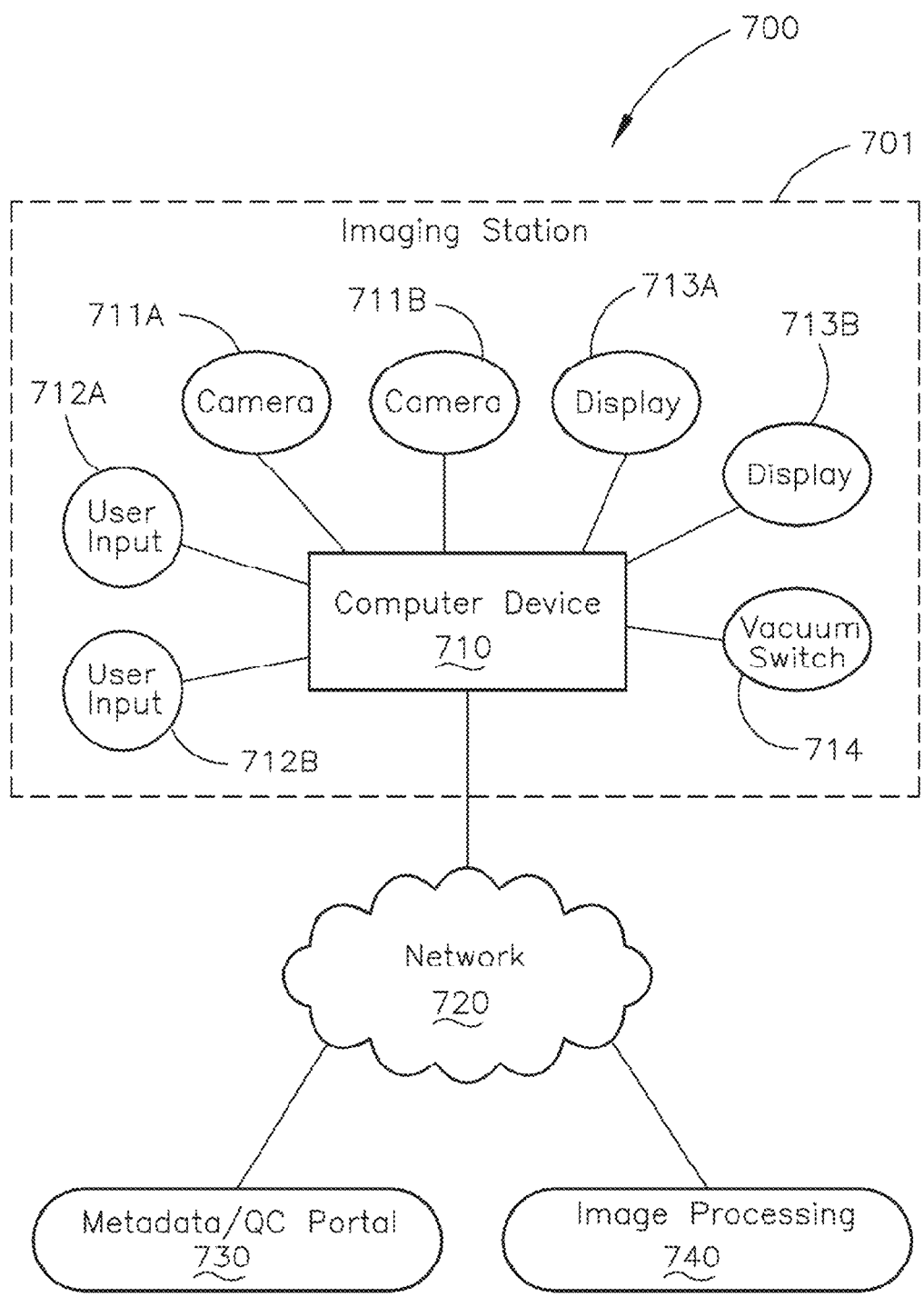
FIG. 7A shows an exemplary system topology diagram of an exemplary embodiment of the invention.
Figure 7B:
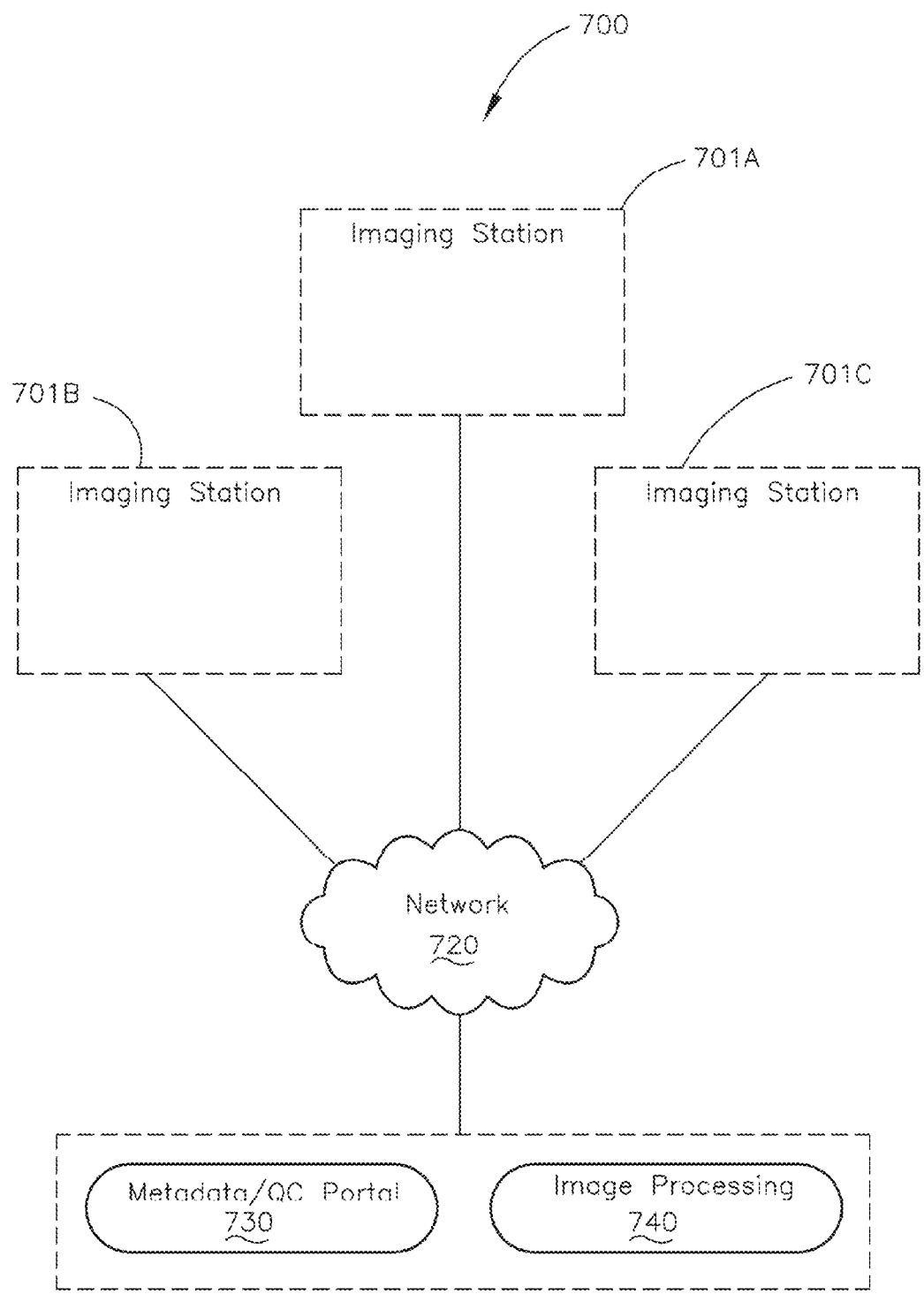
FIG. 7B shows a further exemplary system topology diagram of an exemplary embodiment of the invention.

Referring now to FIGS. 7A-7B, a diagram of an exemplary system 700 of an exemplary embodiment of the invention is depicted. For example, in some embodiments, the system 700 includes one or more imaging stations 701, 701A, 701B, 701C (which, for example, may be implemented as any of imaging stations 100, 200, 300, 500); a network 720; a metadata/quality control portal 730; an imaging processing device or module 740; or the like, wherein the elements of the system are communicatively coupled via the network 720. In some embodiments, the imaging station 701 includes one or more user input devices 712A, 712B; one or more sensor devices, such as cameras 711A, 711B; one or more output devices, such as displays 713A, 713B; a vacuum switch 714; at least one computing device 710; or the like, wherein one or more of the elements of the imaging system 701 are communicatively coupled.

Referring now to FIGS. 8, 9, 10, and 11, exemplary methods 800, 900, 1000, 1100 of some embodiments of the invention are depicted.

Referring now to FIG. 8, an embodiment of the invention includes a method 800. It is contemplated that embodiments of the method 800 can be performed by an apparatus, a system, an apparati of a system, a sub-system of a system, an imaging station 701, one or more elements of an imaging station 701, or the like. Furthermore, it is fully contemplated that the steps of the method 800 may be controlled, instructed, or directed by one or more of the following: a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 800 can include any or all of steps 810, 820, 830, 840 and/or 850, and it is contemplated that the method 800 includes additional steps as disclosed throughout, but not explicitly set forth in this paragraph. Further, it is fully contemplated that the steps of the method 800 can be performed concurrently, sequentially, or in a non-sequential order. Likewise, it is fully contemplated that the method 800 can be performed prior to, concurrently, subsequent to, or in combination with the performance of one or more steps of one or more other methods disclosed throughout.

Embodiments of the method 800 include a step 810, wherein the step 810 comprises creating a non-gravitational force between a document surface of a first portion of a physical document and a document supporting surface of an imaging station. Embodiments of the method 800 also include a step 820, wherein the step 820 comprises attaining at least a substantial degree of mechanical equilibrium between the document surface of the first portion of the physical document and the document supporting surface of the imaging station. Embodiments of the method 800 further include a step 830, wherein the step 830 comprises performing at least one document sense operation. Additionally, embodiments of the method 800 include a step 840, wherein the step 840 comprises reducing the non-gravitational force between the document surface of the first portion of the physical document and the document supporting surface of the imaging station. Furthermore, some embodiments of the method 800 include a step 850, wherein the step 850 comprises performing an additional operation. In some embodiments, the non-gravitational force comprises a pressure acting on an area, an electromagnetic force, an attraction (e.g., an electrostatic attraction), or the like.

Referring now to FIG. 9, an embodiment of the invention includes a method 900. It is contemplated that embodiments of the method 900 can be performed by an apparatus, a system, an apparati of a system, a sub-system of a system, an imaging station 701, one or more elements of an imaging station 701, or the like. Furthermore, it is fully contemplated that the steps of the method 900 may be controlled, instructed, or directed by one or more of the following: a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 900 can include any or all of steps 910, 920, 930, 940 and/or 950, and it is contemplated that the method 900 includes additional steps as disclosed throughout, but not explicitly set forth in this paragraph. Further, it is fully contemplated that the steps of the method 900 can be performed concurrently, sequentially, or in a non-sequential order. Likewise, it is fully contemplated that the method 900 can be performed prior to, concurrently, subsequent to, or in combination with the performance of one or more steps of one or more other methods disclosed throughout.

Embodiments of the method 900 include a step 910, wherein the step 910 comprises creating a pressure differential (e.g., creating the pressure differential by utilizing the Venturi principle). Embodiments of the method 900 also include a step 920, wherein the step 920 comprises attaining at least a substantial degree of mechanical equilibrium between a document surface of a first portion of a physical document and a document supporting surface. Embodiments of the method 900 further include a step 930, wherein the step 930 comprises performing at least one document sense operation. Additionally, embodiments of the method 900 include a step 940, wherein the step 940 comprises reducing the pressure differential (e.g., at least one of: deactivating at least one of an air compressor or a pump; reducing the output of at least one of the compressor or the pump; or the like). Furthermore, some embodiments of the method 900 include a step 950, wherein the step 950 comprises performing an additional operation.

In some embodiments, the step 910 further comprises creating a pressure differential, the pressure differential comprising a difference of pressure between a first space and a second space, the first space comprising at least a portion of a space between a document surface of a first portion of a physical document and a document supporting surface, the second space comprising a space with a pressure acting on a second portion of the physical document, wherein the pressure of the first space is lower than the pressure of the second space.

In some embodiments, the step 930 further comprises performing at least one document imaging operation upon attaining at least the substantial degree of mechanical equilibrium between the document surface of the first portion of the physical document and the document supporting surface; in further embodiments, the step 930 further comprises imaging at least a portion of the physical document upon attaining at least the substantial degree of mechanical equilibrium between the document surface of the first portion of the physical document and the document supporting surface. In some exemplary embodiments, the step 930 comprises performing at least two document imaging operations upon attaining at least the substantial degree of mechanical equilibrium between the document surface of the first portion of the physical document and the document supporting surface. Similarly, the step 930 may comprise imaging at least a first portion of the physical document upon attaining at least the substantial degree of mechanical equilibrium between the document surface of the first portion of the physical document and the document supporting surface; and imaging at least a second portion of the physical document upon imaging at least the first portion of the physical document. Furthermore, in some embodiments, the step 930 may comprise concurrently imaging, by utilizing at least two cameras, at least a first portion of the physical document and at least a second portion of the physical document upon attaining at least the substantial degree of mechanical equilibrium between the document surface of the first portion of the physical document and the document supporting surface.

In some embodiments, performing an additional operation of step 950 comprises performing at least one document positioning operation on the physical document (e.g., moving the physical document from a first position to a second position, altering the orientation of the physical document from a first orientation to a second orientation, or the like). Additionally, in some embodiments, step 950 may comprise performing at least one imaging station positioning operation (e.g., altering an orientation of an element of an imaging station, changing a position of an element of an imaging station, or the like).

In some embodiments, performing an additional operation of step 950 comprises upon reducing the pressure differential, performing at least one operation of creating a subsequent pressure differential, the subsequent pressure differential comprising a difference of pressure between a subsequent first space and a subsequent second space, the subsequent first space comprising at least a portion of a space between a document surface of a first portion of a subsequent physical document and the document supporting surface, the subsequent second space comprising a space with a pressure acting on a second portion of the subsequent physical document, wherein the pressure of the subsequent first space is lower than the pressure of the subsequent second space.

In some embodiments, performing an additional operation of step 950 comprises upon reducing the pressure differential, performing at least one operation of creating a subsequent pressure differential, the subsequent pressure differential comprising a difference of pressure between a subsequent first space and a subsequent second space, the subsequent first space comprising at least a portion of a space between a particular document surface of a subsequent portion of the physical document and the document supporting surface, the subsequent second space comprising a space with a pressure acting on at least one of the second portion or an additional portion of the physical document, wherein the pressure of the subsequent first space is lower than the pressure of the subsequent second space.

Additionally, in some embodiments, performing an additional operation of step 950 comprises at least one of: activating at least one of a compressor or a pump; increasing an output of at least one of the compressor or the pump; creasing or beginning a gaseous output from a compressed gas source; at least partially opening or closing at least one port of at least one valve; or the like.

Further, in some embodiments, the method 900 may include a step of feeding the physical document to the imaging station. The method 900 may also include a step of performing at least one sensor adjustment operation upon performing at least one document sense operation. Additionally, the method 900 may include a step of performing at least one camera adjustment operation upon performing at least one document sense operation. The method 900 may include a step of activating at least one light-source configured to illuminate an area in proximity to the document supporting surface.

Further, in some embodiments, the method 900 may include one or more steps of receiving a user input or instructions. For example, in some embodiments, the method 900 may include one or more of any of the following steps: receiving at least one of a signal or instruction; receiving at least one of a signal or instruction configured to trigger creating a non-gravitational force between a document surface of a first portion of a physical document and a document supporting surface of an imaging station; receiving at least one of a signal or instruction configured to trigger performing at least one document sense operation upon attaining at least the substantial degree of mechanical equilibrium between the document surface of the first portion of the physical document and the document supporting surface of the imaging station; receiving at least one of a signal or instruction configured to trigger reducing the non-gravitational force between the document surface of the first portion of the physical document and the document supporting surface of the imaging station; receiving at least one of a signal or instruction configured to trigger performing at least one additional operation; receiving at least one of a signal or instruction from at least one of a computing device, network, one or more processors, or the like. Additionally, in some embodiments, the method 900 includes a step of outputting data to an output device, or outputting data.

Additionally, in some embodiments of the method 900, performing an additional operation of step 950 comprises at least one of: determining whether there is a substantial degree of equilibrium between the document surface of the first portion of the physical document and the document supporting surface of the imaging station; detecting whether there is a substantial degree of equilibrium between the document surface of the first portion of the physical document and the document supporting surface of the imaging station; or the like.

Referring now to FIG. 10, an embodiment of the invention includes a method 800. It is contemplated that embodiments of the method 1000 can be performed by an apparatus, a system, an apparati of a system, a sub-system of a system, an imaging station 701, one or more elements of an imaging station 701, or the like. Furthermore, it is fully contemplated that the steps of the method 1000 may be controlled, instructed, or directed by one or more of the following: a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 1000 can include any or all of steps 1010, 1020, 1030, 1040, 1050, 1060, 1070, and/or 1080, and it is contemplated that the method 1000 includes additional steps as disclosed throughout, but not explicitly set forth in this paragraph. Further, it is fully contemplated that the steps of the method 1000 can be performed concurrently, sequentially, or in a non-sequential order. Likewise, it is fully contemplated that the method 1000 can be performed prior to, concurrently, subsequent to, or in combination with the performance of one or more steps of one or more other methods disclosed throughout.

Embodiments of the method 1000 include a step 1010, wherein the step 1010 comprises positioning a physical document (e.g., adjusting a vertical position of the physical document; activating a powered (e.g., pneumatically, hydraulically, electrically, or the like) mechanism (e.g., cylinder, motor, or the like) to position the physical document; raising a vertical position of the physical document; or the like). Embodiments of the method 1000 also include a step 1020, wherein the step 1020 comprises positioning a document supporting surface. Embodiments of the method 1000 further include a step 1030, wherein the step 1030 comprises positioning a document surface of a first portion of the physical document to be in proximity to the document supporting surface. Additionally, embodiments of the method 1000 include a step 1040, wherein the step 1040 comprises creating a non-gravitational force between the document surface of the first portion of the physical document and the document supporting surface of the imaging station. Furthermore, embodiments of the method 1000 include a step 1050, wherein the step 1050 comprises attaining a substantial degree of mechanical equilibrium between the document surface of the first portion of the physical document and the document supporting surface of the imaging. Embodiments of the method 1000 further include a step 1060, wherein the step 1060 comprises performing at least one document sense operation. Additionally, embodiments of the method 1000 include a step 1070, wherein the step 1070 comprises reducing the non-gravitational force between the document surface of the first portion of the physical document and the document supporting surface of the imaging station. Furthermore, some embodiments of the method 1000 include a step 1080, wherein the step 1080 comprises performing an additional operation.

In some embodiments, the step 1020 of positioning a document supporting surface further comprises at least one of: positioning a document supporting surface of an imaging station; positioning a document supporting surface toward the physical document; adjusting a horizontal position of a document supporting surface toward the physical document; sliding a document supporting surface toward the physical document; activating a powered mechanism; or the like.

In some embodiments, the step 1030 further comprises: creating a pressure differential, the pressure differential comprising a difference of pressure between a first space and a second space, the first space comprising at least a portion of a space between a document surface of a first portion of a physical document and a document supporting surface, the second space comprising a space with a pressure acting on a second portion of the physical document, wherein the pressure of the first space is lower than the pressure of the second space.

In some embodiments, the step of 1070 further comprises: reducing the pressure differential between the document surface of the first portion of the physical document and the document supporting surface of the imaging station upon performing one or more of the at least one document sense operation.

In some embodiments, the method 1000 further includes one or more steps of: returning the physical document at least substantially to a previous position; returning the document supporting surface at least substantially to a prior position; activating one or more of at least one indicator (e.g., upon positioning the physical document, upon positioning the document supporting surface, upon positioning the document surface of the first portion of the physical document to be in proximity to the document supporting surface, upon creating the non-gravitational force between the document surface of the first portion of the physical document and the document supporting surface of the imaging station, upon creating the non-gravitational force between the document surface of the first portion of the physical document and the document supporting surface of the imaging station, upon attaining the substantial degree of mechanical equilibrium between the document surface of the first portion of the physical document and the document supporting surface of the imaging station, upon performing one or more of the at least one document sense operation, upon reducing the non-gravitational force between the document surface of the first portion of the physical document and the document supporting surface of the imaging station, upon creating the pressure differential, or the like); deactivating the one or more of the at least one indicator; or the like.

Referring now to FIG. 11, an embodiment of the invention includes a method 1100. It is contemplated that embodiments of the method 1100 can be performed by an apparatus, a system, an apparati of a system, a sub-system of a system, an imaging station 701, one or more elements of an imaging station 701, or the like. Furthermore, it is fully contemplated that the steps of the method 1100 may be controlled, instructed, or directed by one or more of the following: a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 1100 can include any or all of steps 1110, 1120, 1130, and/or 1140, and it is contemplated that the method 1100 includes additional steps as disclosed throughout, but not explicitly set forth in this paragraph. Further, it is fully contemplated that the steps of the method 1100 can be performed concurrently, sequentially, or in a non-sequential order. Likewise, it is fully contemplated that the method 1100 can be performed prior to, concurrently, subsequent to, or in combination with the performance of one or more steps of one or more other methods disclosed throughout.

Embodiments of the method 1100 include a step 1110, wherein the step 1110 comprises positioning a physical document (e.g., a microfiche card). Embodiments of the method 1100 also include a step 1120, wherein the step 1120 comprises imaging a translucent portion of the physical document (e.g., imaging a translucent portion of the physical document at a first position). Embodiments of the method 1100 further include a step 1130, wherein the step 1130 comprises imaging an opaque portion of the physical document (e.g., imaging an opaque portion of the physical document at a second position). Furthermore, some embodiments of the method 1100 include a step 1140, wherein the step 1140 comprises performing an additional operation.

In some embodiments, the step 1110 of positioning a physical document further comprises positioning a physical document in a first position. Additionally the step 1110 may further comprise positioning the physical document in a second position. Furthermore, the method 1100 may further comprise at least one of: feeding a second physical document to the first position; and advancing the physical document from a first position to a second position.

In some embodiments the step 1140 of performing an additional operation further comprises activating at least one indicator; back-lighting a translucent portion of the physical document; capturing a textual portion of the opaque portion of the physical document; receiving at least one user input; receiving at least two user inputs; receiving at least one signal or instruction (e.g., from at least one of a computing device or a network); receiving at least one signal or instruction configured to trigger performing at least one of the at least two imaging operations; receiving at least two signals or instructions configured to trigger performing at least two of the at least two imaging operations; or the like.

Figure 12:
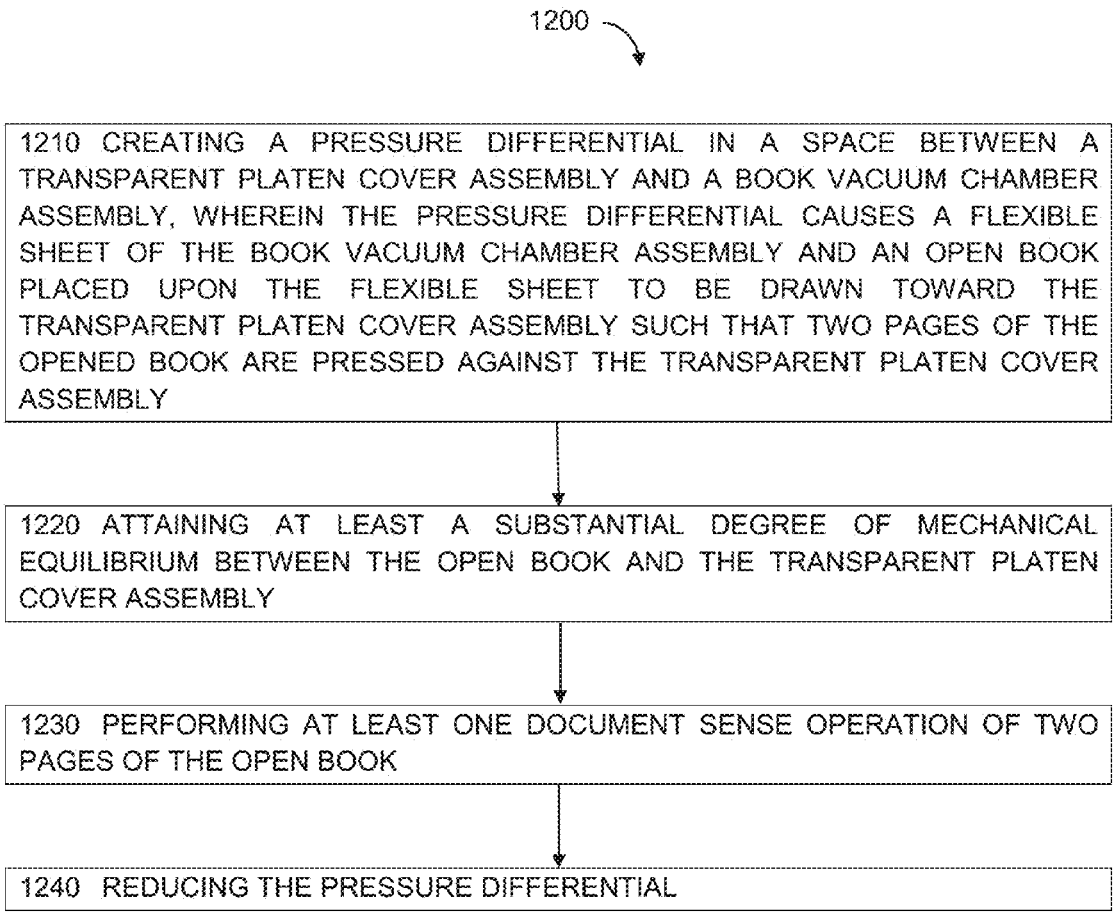
FIG. 12 shows another exemplary method of some embodiments of the invention.

Referring now to FIG. 12, an embodiment of the invention includes a method 1200. It is contemplated that embodiments of the method 1200 can be performed by an apparatus, a system, an apparati of a system, a sub-system of a system, an imaging station 701, one or more elements of an imaging station 701, or the like. Furthermore, it is fully contemplated that the steps of the method 1200 may be controlled, instructed, or directed by one or more of the following: a computing device (such as computing device 710 of the imaging station 701 or another computing device connected to the network 720); at least one component, integrated circuit, controller, processor, or module of a computing device (such as computing device 710 of the imaging station 701 or another computing device connected to the network 720); software or firmware executed on a computing device (such as computing device 710 of the imaging station 701 or another computing device connected to the network 720); other computing devices (such as a computing device of a metadata/quality control portal 730, an image processing portal 740, a mobile computing device, or the like); other computer components; or on other software, firmware, or middleware of a system topology. The method 1200 can include any or all of steps 1210, 1220, 1230, and/or 1240, and it is contemplated that the method 1200 includes additional steps as disclosed throughout, but not explicitly set forth in this paragraph. Further, it is fully contemplated that the steps of the method 1200 can be performed concurrently, sequentially, or in a non-sequential order. Likewise, it is fully contemplated that the method 1200 can be performed prior to, concurrently, subsequent to, or in combination with the performance of one or more steps of one or more other methods disclosed throughout.

Embodiments of the method 1200 include a step 1210, wherein the step 1210 comprises creating a pressure differential (e.g., by utilizing the Venturi principle) in a space between a transparent platen cover assembly and a book vacuum chamber assembly, wherein the pressure differential causes a flexible sheet of the book vacuum chamber assembly and an open book placed upon the flexible sheet to be drawn toward the transparent platen cover assembly such that two pages of the opened book are pressed against the transparent platen cover assembly (e.g., in a single focal plane). In some embodiments, the flexible sheet conforms to the cover-side of the book during the step 1210 of creating the pressure differential in the space between the transparent platen cover assembly and the book vacuum chamber assembly. Embodiments of the method 1200 also include a step 1220, wherein the step 1220 comprises attaining at least a substantial degree of mechanical equilibrium between the open book and the transparent platen cover assembly. Embodiments of the method 1200 further include a step 1230, wherein the step 1230 comprises performing at least one document sense operation of two pages of the open book. Furthermore, some embodiments of the method 1200 include a step 1240, wherein the step 1240 comprises reducing the pressure differential.

In some embodiments, the step 1230 of performing at least one document sense operation further comprises performing at least one document imaging operation of two pages of the open book simultaneously upon attaining at least a substantial degree of mechanical equilibrium between the open book and the transparent platen cover assembly.

In some embodiments, the method 1200 further includes a step of detecting or determining that the transparent platen cover assembly is closed prior to creating a pressure differential in the space between the transparent platen cover assembly and the book vacuum chamber assembly. Additionally, the method 1200 may include activating a vacuum assembly upon detecting or determining that the transparent platen cover assembly is closed. Further, the method 1200 may include deactivating the vacuum assembly to reduce the pressure differential upon performing one or more of the at least one document sense operation of the two pages of the open book. Also, in some embodiments, the method 1200 includes activating a positioning laser prior to creating a pressure differential in the space between the transparent platen cover assembly and the book vacuum chamber assembly, wherein the positioning laser emits a laser pattern on a document imaging area.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
   imaging, by a first camera communicatively coupled to a computing device comprising a processor, an opaque portion of a physical document in a first position to create a first digital image, the physical document comprising a translucent portion surrounded by the opaque portion;
   backlighting the translucent portion of the physical document when the physical document is in a second position;
   imaging, by a second camera communicatively coupled to the computing device, the translucent portion of the physical document in the second position to create a second digital image;
   performing optical character recognition (OCR) operations on the first digital image and the second digital image; and
   creating a searchable text data structure associated with the physical document,
   wherein when in the first position the physical document is positioned on a first portion of a supporting surface, wherein when in the second position the physical document is positioned on a second portion of the supporting surface,
   wherein when in the second position the physical document is positioned between the supporting surface and a second surface, the second surface including a window positioned to allow the second camera to image the translucent portion of the physical document through the window, the second surface being parallel to the supporting surface and positioned between the supporting surface and the second camera.

2. The method of claim 1, wherein the physical document comprises a microfiche document.

3. The method of claim 1, further comprising:
   activating at least one indicator.

4. The method of claim 1, further comprising:
   positioning the physical document in the first position.

5. The method of claim 4, further comprising:
   positioning the physical document in the second position.

6. The method of claim 5, further comprising:
   feeding a second physical document to the first position.

7. The method of claim 6, further comprising:
   advancing the physical document from the first position to the second position.

8. The method of claim 1, further comprising:
   capturing a textual portion of the opaque portion of the physical document when imaging the opaque portion of the physical document in the first position.

9. The method of claim 1, further comprising:
   receiving at least one user input.

10. The method of claim 1, further comprising:
    receiving at least one signal or instruction.

11. The method of claim 1, further comprising:
    receiving a first signal configured to trigger imaging the opaque portion of the physical document; and
    receiving a second signal configured to trigger imaging the translucent portion of the physical document.

12. The method of claim 1, further comprising:
    advancing the physical document from the first position to the second position.

13. The method of claim 1, wherein the physical document is a microfiche card.

14. An imaging station, comprising:
    a supporting surface configured to support a physical document in a first position and a second position, the physical document comprising a translucent portion surrounded by an opaque portion;
    a computing device comprising a processor;
    a first camera configured to image the opaque portion of the physical document in the first position on the supporting surface to create a first digital image, the first camera communicatively coupled to the computing device;
    a light configured to back-light the translucent portion of the physical document when the physical document is in the second position;
    a second camera configured to image the translucent portion of the physical document when the physical document is in the second position on the supporting surface to create a second digital image, the second camera communicatively coupled to the computing device; and
    a second surface including a window positioned to allow the second camera to image the translucent portion of the physical document through the window, the second surface being parallel to the supporting surface and positioned between the supporting surface and the second camera, wherein the physical document is configured to be positioned between the supporting surface and the second surface when the physical document is in the second position,
    wherein the second camera is further configured to image the translucent portion of the physical document through the window of the second surface when the physical document is in the second position on the supporting surface to create the second digital image,
    wherein the computing device is configured to perform optical character recognition (OCR) operations on the first digital image and the second digital image and create a searchable text data structure associated with the physical document.

15. The imaging station of claim 14, wherein the first camera is further configured to capture a textual portion of the opaque portion of the physical document.

16. The imaging station of claim 14, wherein the physical document is a microfiche document.

17. The imaging station of claim 14, wherein the second surface includes ball bearings configured to reduce friction on the physical document when positioning the physical document in the second position between the supporting surface and the second surface.

* * * * *